(12) United States Patent
Schöb et al.

(10) Patent No.: US 10,780,408 B2
(45) Date of Patent: Sep. 22, 2020

(54) MIXING APPARATUS AND SINGLE-USE APPARATUS FOR A MIXING APPARATUS

(71) Applicant: Levitronix GmbH, Zürich (CH)

(72) Inventors: Reto Schöb, Rudolfstetten (CH); Jörg Hugel, Zürich (CH); Thomas Holenstein, Umiken (CH)

(73) Assignee: LEVITRONIX GMBH, Zurich (CH)

( * ) Notice: Subject to any disclaimer, the term of this patent is extended or adjusted under 35 U.S.C. 154(b) by 106 days.

(21) Appl. No.: 15/178,034

(22) Filed: Jun. 9, 2016

(65) Prior Publication Data

US 2017/0007973 A1  Jan. 12, 2017

(30) Foreign Application Priority Data

Jul. 6, 2015  (EP) .................................. 15175527

(51) Int. Cl.
*B01F 13/08*  (2006.01)
*B01F 15/00*  (2006.01)
(Continued)

(52) U.S. Cl.
CPC ...... *B01F 13/0854* (2013.01); *B01F 7/00633* (2013.01); *B01F 13/0872* (2013.01);
(Continued)

(58) Field of Classification Search
CPC ................................................. B01F 13/0854
(Continued)

(56) References Cited

U.S. PATENT DOCUMENTS 3,328,255 A * 6/1967 Ilg .......................... A61M 1/029
                                                            210/710
3,647,397 A * 3/1972 Coleman ............. B01F 13/0818
                                                            366/167.1
(Continued)

FOREIGN PATENT DOCUMENTS

WO        3715978 A1    5/1997
WO     2005068059 A1    7/2005
WO     2012162716 A2   12/2012

OTHER PUBLICATIONS

Extended European Search Report dated Feb. 5, 2016 filed in EP Application No. 15175527.9, filed Jan. 8, 2016.

*Primary Examiner* — David L Sorkin
(74) *Attorney, Agent, or Firm* — Global IP Counselors, LLP

(57) ABSTRACT

A mixing apparatus for mixing substances includes a single-use apparatus and a reusable apparatus. The single-use apparatus includes a flexible mixing tank configured to receive the at least two substances to be mixed, is plastic, and has a rotor arranged in the mixing tank. The rotor includes an impeller configured to mix the at least two substances, the impeller being magnetically contactlessly drivable and free of coils and permanent magnets. The reusable apparatus includes a support tank configured to receive the mixing tank and a stator configured to magnetically contactlessly drive the rotor about an axis of rotation in an operating state. The stator includes at least one permanent magnet configured to generate a permanent magnet flux and at least one winding configured to generate an electromagnetic flux, the permanent magnet flux and the electromagnetic flux together being capable of driving the rotor.

15 Claims, 28 Drawing Sheets

(51) Int. Cl.
  *B01F 7/00* (2006.01)
  *H02K 5/18* (2006.01)
  *H02K 21/38* (2006.01)
  *H02K 11/215* (2016.01)
  *H02K 5/128* (2006.01)
  *H02K 29/08* (2006.01)
  *H02K 21/44* (2006.01)
  *H02K 7/14* (2006.01)
  *H02K 16/00* (2006.01)

(52) U.S. Cl.
  CPC .... *B01F 15/0085* (2013.01); *B01F 15/00688* (2013.01); *H02K 5/128* (2013.01); *H02K 5/18* (2013.01); *H02K 7/14* (2013.01); *H02K 11/215* (2016.01); *H02K 16/00* (2013.01); *H02K 21/38* (2013.01); *H02K 21/44* (2013.01); *H02K 29/08* (2013.01); *B01F 2215/0032* (2013.01)

(58) Field of Classification Search
  USPC .................................................. 366/273, 274
  See application file for complete search history.

(56) References Cited

U.S. PATENT DOCUMENTS

| | | | |
|---|---|---|---|
| 7,832,922 B2* | 11/2010 | Schoeb | B01F 7/00716 366/273 |
| 2005/0002274 A1* | 1/2005 | Terentiev | B01F 1/0011 366/273 |
| 2006/0092761 A1* | 5/2006 | Terentiev | B01F 7/162 366/274 |
| 2007/0263484 A1* | 11/2007 | Terentiev | B01F 7/162 366/273 |
| 2008/0008028 A1* | 1/2008 | Terentiev | B01F 7/162 366/273 |
| 2014/0062239 A1* | 3/2014 | Schoeb | H02K 7/09 310/90.5 |
| 2015/0003189 A1* | 1/2015 | Werth | B01F 7/00858 366/273 |
| 2015/0265985 A1* | 9/2015 | Cutting | B01F 3/12 366/273 |

* cited by examiner

MIXING APPARATUS AND SINGLE-USE APPARATUS FOR A MIXING APPARATUS

CROSS-REFERENCE TO RELATED APPLICATIONS

This application claims priority to EP Application No. 15175527.9, filed Jul. 6, 2015, the contents of which is hereby incorporated herein by reference.

BACKGROUND

Field of the Invention

The invention relates to a mixing apparatus for mixing at least two substances and to a single-use apparatus for a mixing apparatus.

Background of the Invention

Mixing apparatuses for mixing at least two substances, for example two liquids or one liquid with a powder or liquids or suspensions with gases, are used in many technical fields. In a number of applications, the purity of the mixing tank in which the mixing takes place and of the components located therein has a very great significance. The pharmaceutical industry and the biotechnological industry are examples. Solutions and suspensions are frequently produced which require a careful blending of the substances.

In the pharmaceutical industry, for example in the production of pharmaceutically active substances, very high demands are made on purity; the components which come into contact with the substances often even have to be sterile. Similar demands also result in biotechnology, for example in the manufacture, treatment or cultivation of biological substances, cells or microorganisms, where an extremely high degree of purity has to be ensured in order not to endanger the usability of the product produced. Bioreactors can be named as a further example here in which, for example, biological substitutes for tissue or special cells or other very sensitive substances are cultivated. Mixing apparatuses are also required here in order, for example, to ensure a continuous blending of the nutrient fluid or to ensure its continuous circulation in the mixing tank. A very high purity has to be ensured in this respect to protect substances or the produced products from contamination.

SUMMARY

To be able to satisfy the purity demands for the process in the best possible manner, it is endeavored to keep the number of components of a mixing apparatus which come into contact with the respective substances as low as possible. Electromagnetically operated mixing apparatuses are known for this purpose in which a rotor, which typically comprises an impeller, is arranged in the mixing tank. A stator is then provided outside the mixing tank which drives the rotor contactlessly through the wall of the mixing tank and supports it magnetically contactlessly in a desired position by magnetic or electromagnetic fields. This "contactless" concept in particular also has the advantage that no mechanical bearings or leadthroughs into the mixing tank are required which may form a cause of impurities or contaminants.

A particularly efficient apparatus of this type with which substances are circulated or blended in a bioreactor is disclosed within the framework of EP B 2 065 085. The stator and the rotor arranged in the mixing tank form a bearingless motor. The term bearingless motor in this respect means an electromagnetic rotary drive in which the rotor is supported completely magnetically with respect to the stator, with no separate magnetic bearings provided. For this purpose, the stator is configured as a bearing and drive stator which is therefore both the stator of the electric drive and the stator of the magnetic support. A rotating magnetic field can be produced using the electrical windings of the stator which, on the one hand, exerts a torque onto the rotor which effects its rotation and which, on the other hand, exerts a shear force, which can be set as desired, onto the rotor so that the rotor's radial position can be actively controlled or regulated.

The rotor of this mixing apparatus represents an integral rotor because it is both the rotor of the electromagnetic drive and the rotor of the mixer. In addition to the contactless magnetic support, the bearingless motor furthermore provides the advantage of a very compact and space-saving design.

Although the number of the components coming into contact with the substances can be greatly reduced using such magnetically contactlessly supported mixers, the cleaning or the sterilizing of these components is still always associated with a very large effort in time, material and cost. A change is therefore frequently being made—as is also disclosed in the already cited EP B 2 065 085—to design the components coming into contact with the substances as single-use parts for single use. Such a mixing apparatus is then composed of a single-use apparatus and a reusable apparatus. In this respect, the single-use apparatus comprises those components which are intended for single use, that is, for example, the mixing tank with the rotor, and the reusable apparatus composes those components which are used permanently, that is multiple times, for example the stator.

In the configuration as a single-use part, the mixing tank is frequently designed as a flexible plastic pouch with a rotor contained therein. These pouches are frequently already sterilized during manufacture or after the packaging and storing and are supplied to the customer in sterile form in the packaging.

It is an important criterion for the manufacture or design of single-use parts for single use that they can be assembled in as simple a manner as possible with the reusable apparatus or its components. It is desirable that this assembly can take place with as little effort as possible, with little work, fast, and preferably without tools.

Another aspect is that these single-use parts can be manufactured as economically and inexpensively as possible. In this respect value is in particular also placed on reasonably priced simple starting materials such as commercial plastics. An environmentally aware handling and a responsible use of the available resources are also major aspects in the design of disposable parts.

Starting from this prior art, it is an object of the invention to provide another mixing apparatus for mixing substances which comprises a single-use apparatus for single use and a reusable apparatus for multiple use in which the single-use parts can be manufactured economically, inexpensively and as simply as possible without any compromises in operability being necessary for this purpose.

The subject of the invention satisfying this object is characterized by the features of the of the device described herein.

In accordance with the invention, a mixing apparatus for mixing at least two substances is proposed having a single-use apparatus which is configured for single use and having a reusable apparatus which is configured for multiple use, wherein the single-use apparatus comprises a flexible mixing tank for receiving the substances to be mixed which is manufactured from a plastic and a rotor which is arranged in the mixing tank, which comprises an impeller for mixing the substances, which can be magnetically contactlessly driven and which is configured as free of coils and free of permanent magnets, and wherein the reusable apparatus comprises a support tank for receiving the mixing tank as well as a stator with which the rotor can be driven magnetically contactlessly about a desired axis of rotation in the operating state, wherein the stator comprises at least one permanent magnet for generating a permanent magnet flux as well as at least one winding for generating an electromagnetic flux, wherein the permanent magnet flux and the electromagnetic flux drive the rotor together.

It is possible to generate the magnetic flux in the stator, which is a component of the reusable apparatus, due to the specific embodiment of the stator, which comprises at least one permanent magnet. It in particular hereby becomes possible that the rotor of the mixing apparatus which is configured as a single-use part only contributes a little, if anything, to the generation of the magnetic flux, but rather only has to conduct or guide it. It is thus possible to dispense with strong permanent magnets or magnetically very hard materials in the rotor.

It is customary in accordance with today's prior art in particular to use metals of the rare earths or compounds or alloys of these metals as permanent magnets in the rotor because very strong permanent magnetic fields can be generated using them due to their magnetic properties. Known and frequently used examples of these rare earths are neodymium and samarium. However, such metals represent a substantial cost factor due to their comparatively small occurrence and due to their complex and/or expensive mining and processing. In addition, the waste disposal of such permanent magnets after a single use is frequently also associated with problems or a high effort under technical environmental aspects, whereby additional costs arise. It is therefore particularly advantageous under economic, cost and environmental aspects that the invention makes it possible in particular to be able to dispense with such permanent magnet materials consisting of or comprising rare earths in the rotors designed for single-use.

Depending on the configuration, different jackets, gaps and walls, in particular the jacket of the magnetically active core, the fluid gap, a bucket which is part of the single-use apparatus and a separating can which surrounds the stator, are accommodated in the region between the stator and the magnetically active core of the rotor. In order to accommodate all these elements, a spacing of at least 3 mm, preferably 4-6 millimeters, is preferred between the stator and the magnetically active core of the rotor. Since the rotor of the mixing apparatus in accordance with the invention should not have any permanent magnets and thus cannot contribute to the magnetomotive force, the total magnetomotive force has to be produced in the stator. For a spacing of, for example, 3 millimeters between the stator and the magnetically active core of the rotor, a magnetomotive force of around 5000 amperes is necessary to be able to support and drive the rotor in an active magnetic manner. If the stator is excited as customary solely by windings, such a high magnetomotive force is impossible to realize in the tight construction space of the stator with reasonable dimensions. In accordance with the invention, one or more permanent magnets are therefore provided in the stator which generate a constant premagnetization flux. However, since neither a rotating field for generating a toque nor a regulable magnetic flux for the active magnetic support of the rotor can be generated with a constant magnetic flux, coils are additionally attached in the stator by which additional electromagnetic magnetic fluxes are produced which are thus variable and regulable. In this respect, the electromagnetic flux paths are preferably conducted such that they do not lead through the permanent magnet or permanent magnets. Most permanent magnets, in particular rare earth magnets, but also ferrite magnets, have a relative permeability which is only insignificantly above one. If the electromagnetic flux paths were therefore to lead through the permanent magnet or permanent magnets, the electromagnetically active air gap would thus increase by the construction height of the permanent magnets located in the flux path and would additionally increase the magnetomotive force requirement. It is thus an essential aspect of the invention that the permanent magnetically excited fluxes and the electromagnetically excited fluxes are guided so that they superpose in the magnetic air gap between the stator and the rotor, but are conducted separately in the region of the permanent magnets. The electromagnetically excited fluxes should be conducted, where possible, through magnetically soft material such as iron or silicon iron in addition to the region of the air gaps between the rotor and the stator. The air gap fluxes can be modulated by the superposition of the permanent magnetically excited fluxes and the electromagnetically excited fluxes in the region of the air gaps between the rotor and the stator such that both a regulation of the radial rotor position and the building of tangential force components, which effect a torque, are made possible.

This can be produced particularly simply, economically and inexpensively due to the complete omission of permanent magnets in the rotor, which represents a huge advantage for a single-use part. The omission of permanent magnets is also advantageous with respect to the shipping of the single-use apparatus, for example to the customer or after use to waste disposal companies, because they are subject to special declaration during cross-border transport, in particular also during air transport, depending on the material, which causes an additional effort and additional costs.

It is also preferred for these reasons for the electromagnetic flux not to be conducted through the permanent magnet.

The stator is preferably designed as a bearing and drive stator by which the rotor can be driven magnetically contactlessly about the desired axis of rotation in the operating state and can be magnetically contactlessly supported with respect to the stator. This embodiment makes possible a particularly inexpensive and also space-saving, compact design because the stator is not only configured as a drive stator, but is also simultaneously the stator for the magnetic support of the rotor.

It is advantageous in an embodiment as an external rotor for the reusable apparatus to have a separating can for receiving the stator which is preferably fixable with respect to the support tank. Due to this measure it is particularly simple to position the rotor and the stator relative to one another on the assembly of the single-use apparatus and the reusable apparatus.

It is particularly preferred for construction reasons in this respect for the stator to be surrounded at least radially by the separating can and for the rotor to be arranged outside the separating can with respect to the radial direction.

A further advantageous measure is for the single-use apparatus to comprise a bucket composed of plastic which at least radially surrounds the separating can in the inserted state of the single-use apparatus and is arranged radially within the rotor since this bucket allows a particularly simple assembly of the single-use apparatus and the reusable apparatus.

The stator preferably comprises pronounced poles because a good guidance of the magnetic flux is thus ensured.

A particularly advantageous embodiment of the stator comprises an upper stator part having a plurality of pronounced upper poles for carrying upper windings and a lower stator part having a plurality of pronounced lower poles for carrying lower windings, wherein the upper stator part and the lower stator part are arranged spaced apart from one another with respect to the axial direction and wherein a permanent magnet is provided between the upper stator part and the lower stator part.

It is advantageous with respect to the stator if the upper stator part or the lower stator part comprises exactly three or exactly four or exactly six upper and lower poles. The embodiment with three poles has the advantage that it in particular leaves a particularly large amount of space for the coils or for the windings of the stator in embodiments of the rotor and stator as external rotors at the poles of the stator. This embodiment additionally allows a particularly high electromagnetic magnetomotive force. The embodiment with four poles has the advantage that it allows a particularly symmetrical arrangement of the poles, which is particularly favorable from a technical control or regulation aspect. The embodiment with six poles is advantageous because it allows a particularly favorable and homogeneous generation of the torque and of the shear force on the rotor.

It is preferred if the number of the upper poles is the same as the number of lower poles. This allows a particularly simple manufacturing process and additionally simplifies the electrical control and the regulation of the apparatus.

A further advantageous embodiment comprises the upper stator part and the lower stator part being arranged rotated by an angle with respect to one another with respect to the desired axis of rotation so that, viewed in the axial direction, the upper poles are each arranged in a gap between two adjacent lower poles, with the angle preferably amounting to 360° divided by the total number of upper and lower poles. It can be ensured particularly easily by this measure that a torque can be generated on the rotor by the one of the two stator parts, while simultaneously a resulting shear force can be generated on the rotor in the radial direction by the other stator part.

In a further preferred embodiment, the number of upper poles and the number of lower poles is an even number, with the upper poles and the lower poles being arranged such that they overlap viewed in an axial direction. The rotor can also be actively magnetically regulated by this measure with respect to tilts against the desired axis of rotation (two degrees of freedom).

It is particularly advantageous if the rotor is passively magnetically supported in the axial direction because then no additional bearings are required with respect to the axial direction.

A preferred embodiment is furthermore presented when the rotor is passively magnetically supported against tilts because then no further measures are required for this stabilization either.

It is advantageous for the passive magnetic stabilization with respect to tilts for the rotor to comprise a magnetically active core and for the inner diameter of the rotor to be at least 2.6 times as large as the height of the magnetically active core of the rotor.

A further preferred embodiment is characterized in that the rotor comprises at least two impellers for mixing the substances which are arranged spaced apart from one another with respect to the axial direction. A particularly good and homogeneous blending of the substances is in particular thereby ensured even with larger mixing tanks.

It is another preferred embodiment that at least two rotors are provided which are arranged in the mixing tank and of which each respectively comprises an impeller for mixing the substances, is respectively magnetically contactlessly drivable and is respectively designed as free of coils and preferably also free of permanent magnets, wherein the rotors are arranged spaced apart from one another and coaxially with respect to the axial direction in the operating state and that the reusable apparatus has two stators of which each is configured as a bearing and drive stator, wherein each stator respectively comprises an upper stator part having a plurality of pronounced upper poles for carrying upper windings and a lower stator part having a plurality of pronounced lower poles for carrying lower windings, wherein the upper stator part and the lower stator part of each stator are arranged spaced apart from one another with respect to the axial direction, wherein a permanent magnet is respectively provided between the upper stator part and the lower stator part, and wherein the two stators are arranged spaced apart from one another with respect to the axial direction in the operating state. This embodiment with at least two stators and with at least two rotors allows operating states, for example, in which the two rotors rotate in opposite directions and/or at different speeds. In this respect, a separate stator is associated with each rotor and drives this rotor contactlessly and simultaneously supports it magnetically contactlessly.

It is an advantageous measure that the magnetically active core of the rotor has a plurality of pronounced rotor poles which face the poles of the stator in the operating state. A particularly good and efficient guidance of the magnetic flux can hereby be ensured.

In this respect, depending on the embodiment, it is a preferred measure for the rotor poles to be configured or arranged so asymmetrically that positions of engagement are avoided with respect to the stator in the operating state. This asymmetry is particularly suitable if the stator comprises a relatively small number of poles, for example a respective three or four upper and lower poles. There are a number of possibilities to realize the asymmetry; for example, the symmetry between the rotor poles and the poles of the stator can be broken by the length of the rotor poles measured in the peripheral direction or by the angular spacing of the rotor poles. Such relative rotary positions between the rotor and the stator should be avoided by this measure in which it is no longer possible, due to the symmetry, to exert a resulting torque on the rotor by the stator, that is in which the rotor engages when standing still.

It is a further advantageous measure that the magnetically active core of the rotor has a ring-shaped design, with a peripheral ring of constant diameter being formed at the center with respect to the axial direction and with the rotor poles being provided above and below the ring. The number of the position sensors in the stator with which the radial position of the rotor relative to the stator is determined can be reduced by this measure.

It is preferred for the generation of the electromagnetic fields or of the rotary fields that a coil is arranged as a winding at each upper stator pole and at each lower stator pole, wherein a respective separate power amplifier is provided for each coil with which the coil current or the coil voltage for the coil can respectively be regulated independently of the coil currents or of the coil voltages of the other coils. This measure is particularly advantageous to exert both a torque on the rotor by the stator and also a shear force, which can be set as desired, in the radial direction by which the radial position of the rotor—that is its position in the plane perpendicular to the desired axis of rotation—can be actively magnetically regulated. The independent control capability of each coil additionally makes it possible that the position of the rotor with respect to tilts against the desired axis of rotation (two degrees of freedom) can be actively magnetically regulated by the cooperation of the upper stator part and of the lower stator part.

Alternatively, it is a preferred measure if one respective coil is arranged as a winding on each upper stator pole and on each lower stator pole, wherein two respective coils are connected together to an electrical phase, and wherein a respective separate power amplifier is provided for each electrical phase. In this respect, it is possible both to connect two respective coils of the upper poles or two respective coils of the lower poles together and a coil of an upper pole to a coil of a lower pole. In the last-named case, it is preferred for coils respectively arranged above one another to be connected together. The number of the required power amplifiers can be reduced by this connecting together of two coils to an electrical phase. In addition, conventional three-phase controllers can then be used as power amplifiers, for example, in an embodiment having six upper poles and six lower poles in the stator.

It is very particularly preferred with respect to the embodiment of the stator for the permanent magnet of each stator to be designed in disk form or ring form, to be magnetized in the axial direction and in each case to connect the upper stator part to the lower stator part, wherein the permanent magnetically generated flux can naturally also be conducted through additional magnetically soft parts. The permanent magnet can likewise be made up of a plurality of individual magnets such as segment magnets or block magnets.

A single-use apparatus for a mixing apparatus for mixing at least two substances is furthermore proposed by the invention, said single-use apparatus comprising a reusable apparatus which is designed for multiple use, with the single-use apparatus being designed for a single use and comprising a flexible mixing tank, which is manufactured from a plastic, for receiving the substances to be mixed and a rotor which is arranged in the mixing tank, which comprises an impeller for mixing the substances and which is designed for a contactless magnetic drive, wherein the single-use apparatus is designed for cooperation with the reusable apparatus and can be placed into a support tank of the reusable device, wherein the rotor can be contactlessly driven by a stator of the reusable device about a desired axis of rotation by a rotating magnetic field and wherein the rotor is designed free of coils and free of permanent magnets.

In the same according manner as was already explained further above, the rotor of the single-use apparatus in accordance with the invention can be produced especially simply, economically and inexpensively due to the complete omission of permanent magnets, which represents a huge advantage for a single-use part. The omission of permanent magnets is also advantageous with respect to the shipping of the single-use apparatus, for example to a customer or to a waste disposal firm after use, because said permanent magnets have to be specifically declared, depending on their material, in cross-border traffic, in particular also in air traffic, which causes additional effort and additional costs.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

Figure 1:
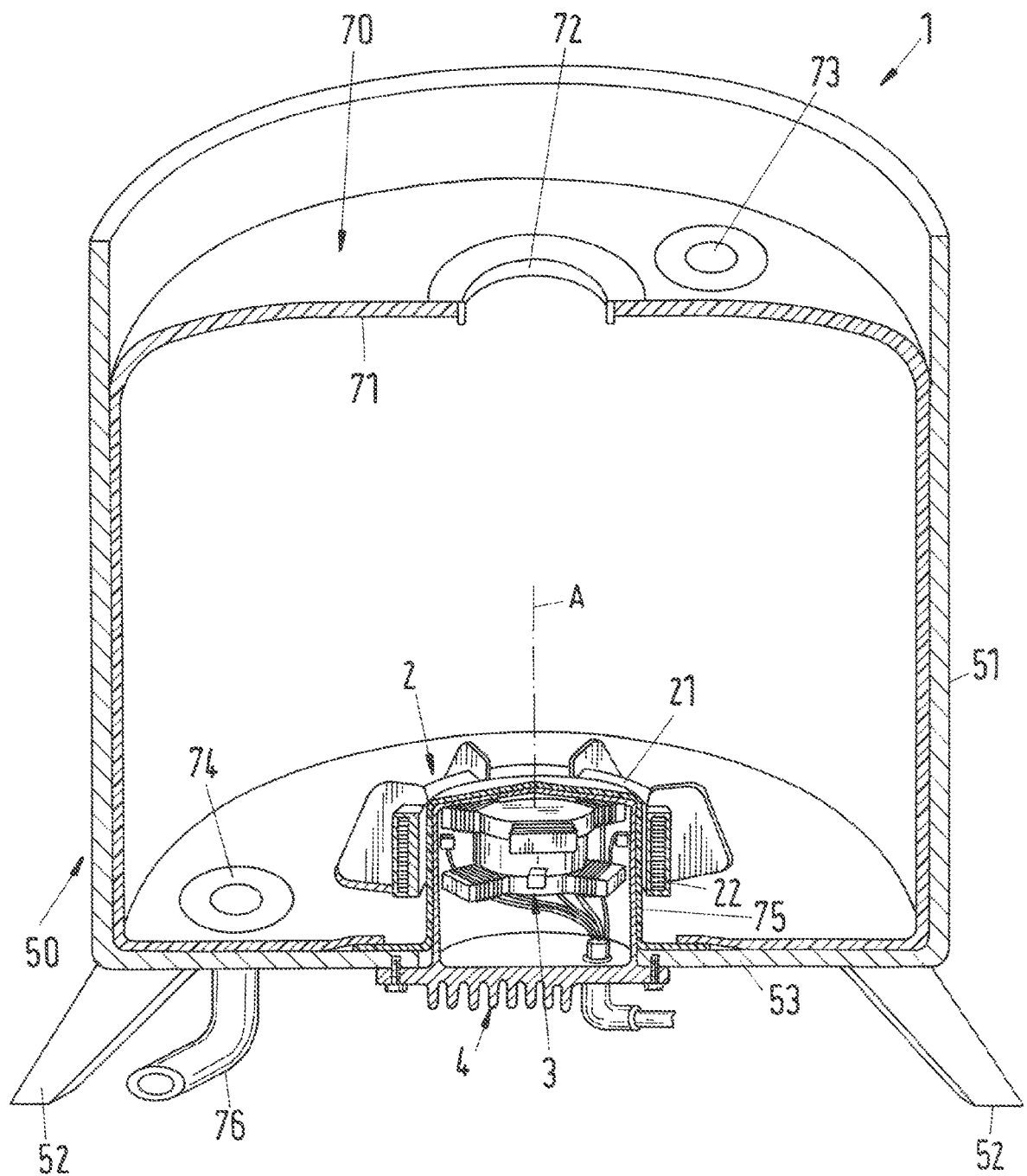
FIG. 1 is a perspective sectional representation of a first embodiment of a mixing apparatus in accordance with the invention.

FIG. 1 shows in a perspective sectional representation of a first embodiment of a mixing apparatus in accordance with the invention which is designated as a whole by the reference numeral 1. Such mixing apparatus 1 can in particular be used in the pharmaceutical industry and in the biotechnological industry. The mixing apparatus in accordance with the invention is specifically suitable for such applications in which a very high degree of purity or sterility of those components is key which come into contact with the substances to be mixed. The mixing apparatus in accordance with the invention can also be configured as a bioreactor or as a fermentor. It is understood, however, that the invention is not restricted to those embodiments, but rather relates very generally to a mixing apparatus with which media or substances can be mixed. These substances can in particular be fluids or solids, preferably powders. The mixing apparatus 1 in accordance with the invention is suitable for mixing liquids among one another and/or for mixing at least one liquid with a powder or other solid and/or for mixing gases with liquids and/or solids.

To ensure the purity or the sterility of those components which come into contact with the substances to be mixed, the mixing apparatus 1 in accordance with the invention comprises a single-use apparatus which is designated as a whole by the reference numeral 70 and is configured for a single use as well as a reusable apparatus which is designated as a whole by the reference numeral 50 and which is configured for permanent use, that is for multiple use. In this respect, the single-use apparatus 70 comprises those components which come into contact with the substances to be mixed during the mixing process.

In this respect those components or parts are meant by the term "single-use apparatus" and other compound words having the element "single-use" such as single-use part, single-use component, etc. which are configured for single use, that is which are used only one single time as intended and are then disposed of. A new, previously unused single-use part then has to be used for a new application. In the design or configuration of the single-use apparatus 70, essential aspects are therefore that the single-use apparatus 70 can be manufactured as simply and economically as possible, causes few costs and can be manufactured from materials which are available as inexpensively as possible. Another essential aspect is that the single-use apparatus 70 can be assembled in as simple a manner as possible with the reusable apparatus 50 to form the mixing apparatus 1. The single-use apparatus 70 should therefore be able to be replaced in a very simple manner without a high installation effort being required for this purpose. The single-use apparatus 70 should particularly preferably be able to be assembled with the reusable apparatus 50 without using tools.

It is also an important aspect that the single-use apparatus 70 can be disposed of as simply as possible after its use. Those materials are therefore preferred which bring about environmental pollution which is as low as possible, in particular also during their disposal.

Further aspects of the single-part apparatus 70 will be looked at further below.

In the first embodiment shown in FIG. 1, the single-use apparatus 70 comprises a flexible mixing tank 71 for receiving the substances to be mixed which is manufactured from a plastic. The mixing tank 71 is preferably a flexible pouch, for example a plastic sack or a sack of a synthetic material, which can be folded together so that is takes up as little space as possible during storage. The mixing tank 71 has at least one inlet 72 through which the substances to be mixed can be introduced into the mixing tank. At least one further inlet 73 is furthermore provided. The further inlet 73 or the further inlets 73 can, for example, be used for the supply of further substances, e.g. during the mixing process. It is also possible to use the further inlet 73 for the reception of probes or measuring sensors with which parameters, e.g. temperature, pressure, concentrations, etc., can be monitored during the mixing process. The further inlet or inlets 73 can also be used for the mass transfer, in particular during the mixing process. Gases, for example required in an embodiment as a bioreactor, can specifically be supplied or removed in this respect. There is in particular frequently a necessity in the cultivation of microorganisms or biological tissue or cells that oxygen or air can be supplied to the mixing tank 71 and other gases, in particular carbon dioxide, can be drained out of the mixing tank 71.

Furthermore at least one outlet 74 is provided at the base of the mixing tank 71 through which substances, for example the blended substances, can be drained. The outlet 74 arranged at the base can, however, also be used to introduce a gas into the mixing tank 71 which is intended to rise through the substances located in the mixing tank 71.

The mixing tank furthermore has in its base region a substantially cylindrical bucket 75 which extends in the inner space of the mixing tank 71 and is arranged at the center of the base region. The cylindrical bucket 75 is preferably stable in shape and produced from a plastic. However, it can also, for example, be configured in the form of a flexible hose or pouch.

The single-use apparatus 70 furthermore comprises a rotor 2 which is arranged in the mixing tank 71 and which comprises an impeller 21 having a plurality of blades for mixing the substances. So that the rotor 2 can be magnetically contactlessly driven—that is can be set into rotation—it comprises a magnetically active core 22 (see also FIG. 2 and FIG. 4) which is arranged radially inwardly disposed with respect to the impeller 21. The rotor 2 has a substantially ring-shaped design with a central opening so that it is arranged, in the position of use which is shown in FIG. 1, around the bucket 75 which is then located in the central opening of the rotor 2.

The reusable apparatus 50 comprises a stable-shape support tank 51 for receiving the mixing tank 71. The support tank 51 has a plurality of feet 52 on which the support tank 51 stands at its base 53. At least one opening (not recognizable in FIG. 1) is furthermore provided in the base 53 which cooperates with the outlet 74 of the mixing tank 71 in the assembled state so that substances can be drained from the mixing tank 71 or introduced into it through the outlet 74 and through a line 76 leading through the opening. Since the line 76 comes into contact with at least some of the substances, it is a component of the single-use apparatus and is integrally shaped or can be inserted into the base of the mixing tank 71, for example.

The substantially cylindrically configured support tank 51 is open at its upper side so that the mixing tank 71 can be introduced into the support tank 51 without problem.

The support tank 51 has at its base 53 a centrally arranged separating can 4, which is substantially cylindrical in shape, for receiving a stator 3. The separating can 4 extends in the direction of its cylinder axis upwardly in accordance with the representation so that it is arranged coaxially in the bucket 75 of the mixing tank 71 in the assembled state. The dimensions of the separating can 4 and of the bucket 75 are adapted to one another in this respect such that the bucket tightly surrounds the separating can 4 in the assembled state and its jacket surface contacts the jacket surface of the separating can 4.

The stator 3 is arranged in the separating can 4 and is designed as a bearing and drive stator with which the rotor 2, in the operating state, can be driven contactlessly about a desired axis of rotation A and can be magnetically contactlessly supported with respect to the stator 3.

In the following, that axis of rotation will be designated by the desired axis of rotation A about which the rotor 2 rotates when it is located in the plane perpendicular to the cylinder axis of the separating can 4 in a centered position with respect to the stator 3 and is not tilted with respect to this cylinder axis. The desired axis of rotation A as a rule coincides with the cylinder axis of the separating can 4.

In the following, the direction defined by the desired axis of rotation A will be called the axial direction, the directions perpendicular thereto will generally be called the radial direction. That plane perpendicular to the desired axis of rotation A which is the magnetic central plane of the stator 3 is called the radial plane. The radial plane defines the x-y plane of a Cartesian coordinate system whose z axis extends in the axial direction.

The assembly of the single-use apparatus 70 and of the reusable apparatus 50 to form the mixing apparatus 1 is extremely simple and can be carried out fast and in particular without tools. For this purpose, the mixing tank 71, which is typically folded together for storage, is removed from its packaging together with the rotor 2 located therein, is placed into the support tank 51 and the bucket 75 with the rotor 2 disposed around it is pushed over the separating can 4. The mixing apparatus 1 is then already ready for use. After use, the mixing tank 71 with the bucket 75 and the rotor 2 is simply pulled out of the support tank 51. The bucket 72 in this respect simply releases from the separating can 4. This particularly simple and problem-free connection and separation of the single-use apparatus 70 to and from the reusable apparatus 50 thus takes account of a substantial aspect of the embodiment for the single use.

Figure 2:
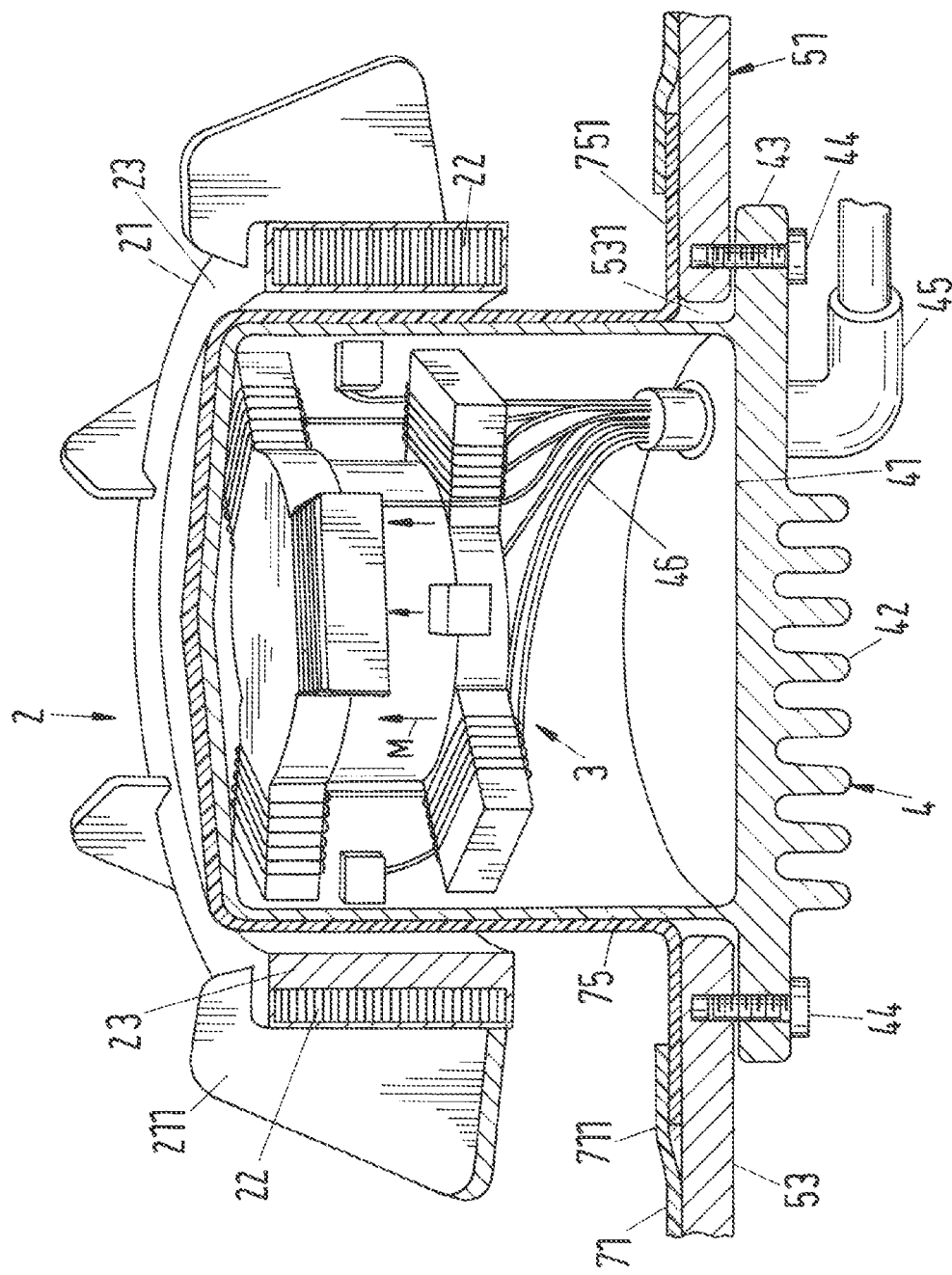
FIG. 2 is a perspective sectional represent of the rotor and of the stator of the first embodiment.

FIG. 2 shows the rotor 2 and the stator 3 of the first embodiment in an illustration analog with, but enlarged with respect to FIG. 1.

The stator 3 in this embodiment is poured by a thermally conductive compound in the separating can 4 and is thus fixed in the separating can 4. The separating can 4 is closed in accordance with the illustration at the bottom by a can base 41 which has a plurality of cooling ribs 42. The can base 41 comprises a radially outwardly disposed flange 43 which serves for the fastening of the separating can 4 at the base 53 of the support tank 51.

The base 53 has a centrally arranged circular opening 531 which is dimensioned such that the separating can 4 can be pushed in accordance with the illustration from below through the opening 531 into the inner space of the support tank 51 and can then be fixed at the base 53 of the support tank 51 by screws 44 which engage through the flange 43. The can base 41 has a bore through which a line 45 extends into the inner space of the separating can 4. All the electrical connections which are required for the energy supply and the control of the stator as well as for the data exchange between sensors and measuring devices using a control and regulation device, not shown, are collected in the line 45. The electrical connections are provided as a whole with the reference numeral 46. The separating can 4 can be produced from a metallic material or from a plastic.

A variant to the fixed connection between the separating can 4 and the support tank 51 comprises the separating can 4 only being introduced in accordance with the illustration from below into the bucket 75 after the placing of the mixing tank 71. This introduction can take place either by hand or also by a lifting device which moves the separating can 4 through the opening 531 into the bucket 75 and then holds it in this position. No separate fixing of the separating can 4 to the support tank 51 is necessary in this variant. After use, the lifting device then moves the separating can 4 back down in accordance with the illustration (FIG. 2).

Since the bucket 75 of the mixing tank 71 is configured in stable shape in a preferred variant, but the remainder of the mixing tank 71 configured as a pouch typically is not, it is advantageous, but not absolutely necessary, to manufacture the bucket 75 as a separate part and subsequently to connect it to the mixing tank 71. A possibility for this is in particular also shown in FIG. 2. The shape-stable, substantially cylindrical bucket is manufactured as a separate part, for example using an injection molding process, having a flange 751 extending along the periphery at its end at the bottom in accordance with the illustration—that is at the open end—and extending in the radial direction. The remainder of the mixing tank 71 configured as a pouch has a circular opening whose diameter is smaller than the diameter of the flange 751. The bucket 75 is then introduced into the mixing tank 71 so that the margin 711, which bounds the circular opening, lies on the flange 751 of the bucket 75 and overlaps with it. Subsequently, the bucket 75 is welded or adhesively bonded to the mixing tank in the region of the overlap between the flange 751 and the margin 711 so that the weld seam or bond seam connects the bucket 75 firmly and unreleasably to the mixing tank 71.

Figure 3:
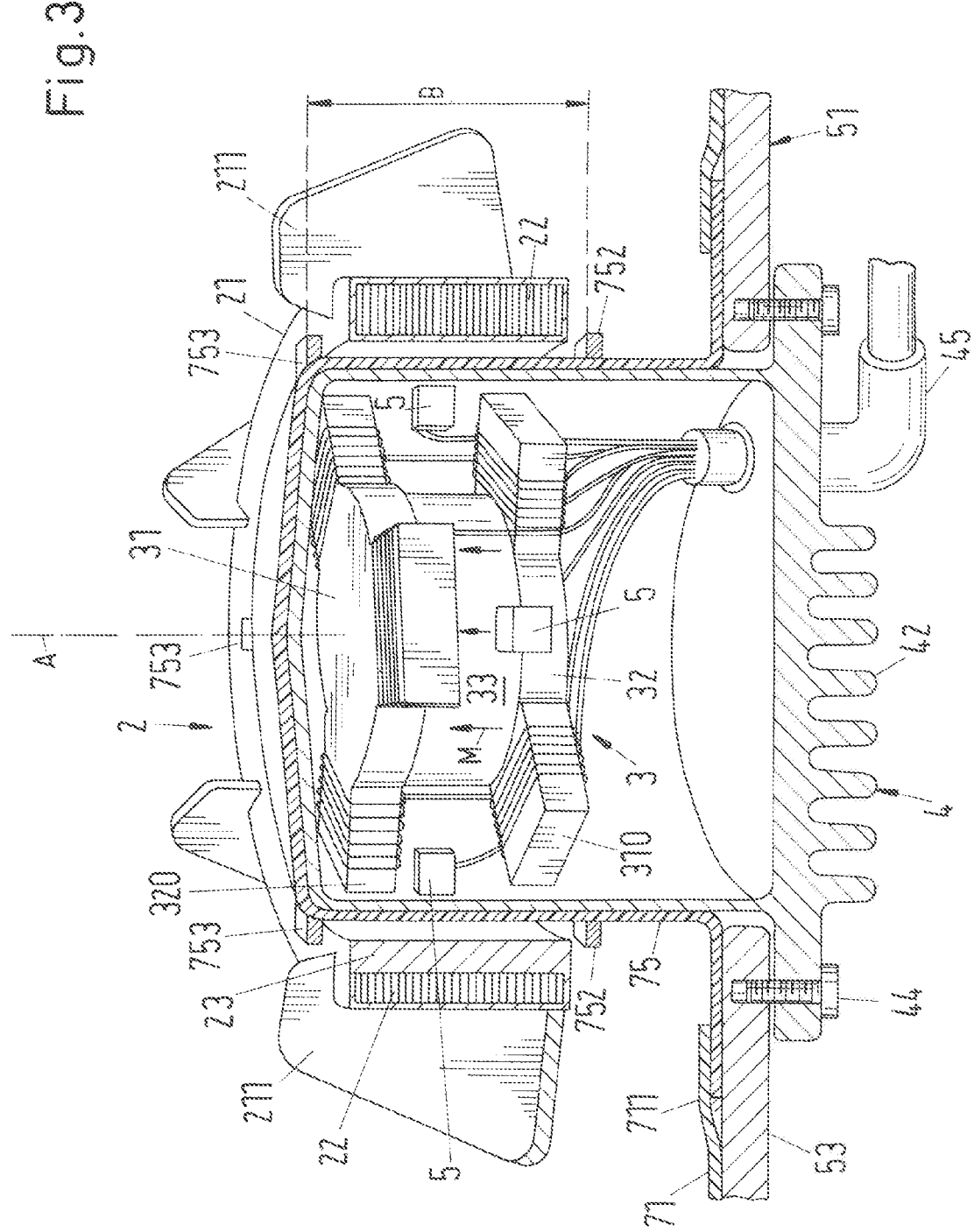
FIG. 3 is as FIG. 2, but with additional holding elements for the rotor.

A preferred variant for the configuration of the bucket 75 is shown in FIG. 3 in a representation analog to FIG. 2. In this variant, a plurality of upper holding elements 753 and lower holding elements 752 are arranged distributed over the periphery of the bucket 75 at the outer jacket surface of the bucket 75. A respective four upper and lower holding elements 753 and 752 respectively are provided in the variant shown. Each holding element 752, 753 is respectively configured as a nub which extends away from the desired axis of rotation A in the radial direction. In this respect, a respective upper holding element 753 and a lower holding element 752 are arranged pair-wise such that they are aligned with one another with respect to the axial direction and are remote from one another by a distance B. The distance B is selected in this respect such that the rotor 2 fits between the upper and the lower holding elements 753 and 752 with a considerable clearance with respect to the axial direction. The length of the holding elements 752 and 753 in the radial direction is dimensioned such that the movement possibility of the rotor 2 in the axial direction is restricted by the holding elements 753 and 752 respectively. The rotor 2 can therefore only move in the axial direction between the holding elements 753 and 752. This measure is in particular advantageous for the storage of the mixing tank 75 prior to use and for the insertion of the mixing tank 75 with the rotor 2 located therein into the support tank 51 because the rotor 2 is thus held approximately in the position which it should adopt during operation. The holding elements 753, 752 have no function during the operation of the mixing apparatus 1.

Figure 4:
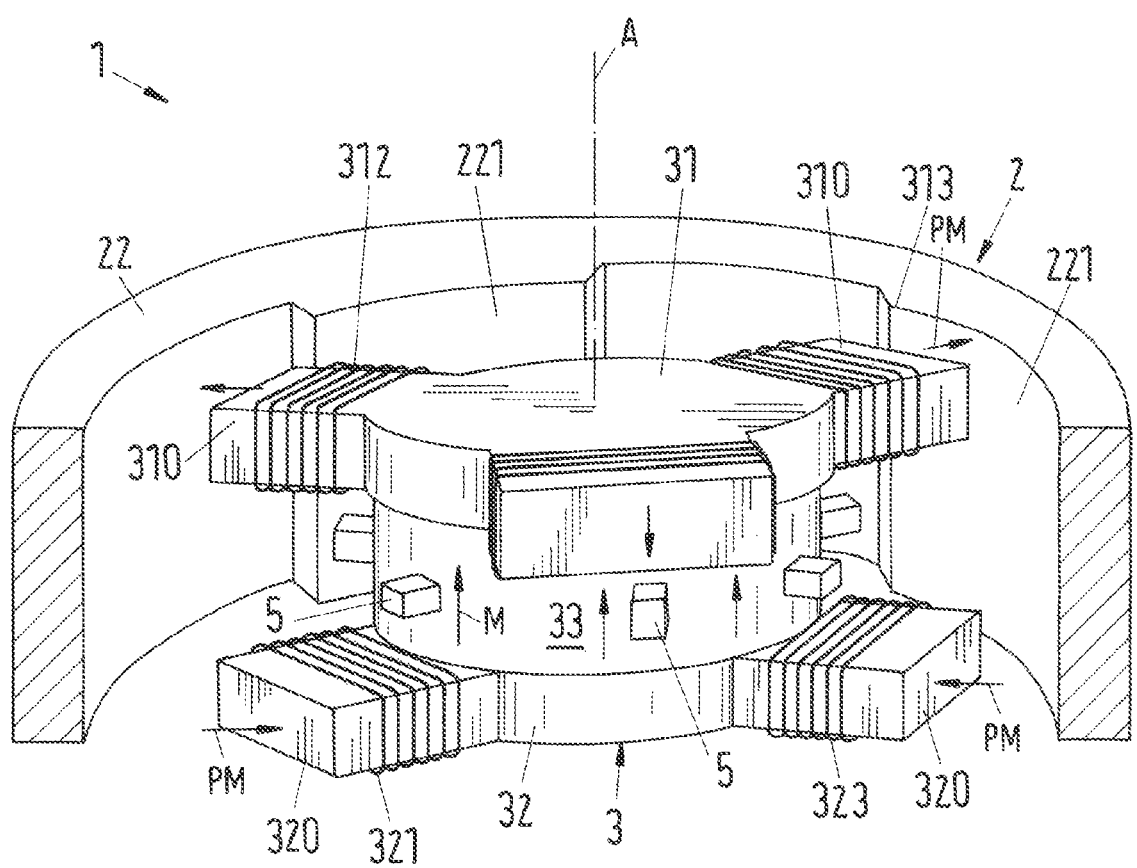
FIG. 4 is a perspective sectional representation of the stator and of the magnetically active core of the rotor for a variant of the first embodiment with an alternative arrangement of the position sensors.
Figure 5:
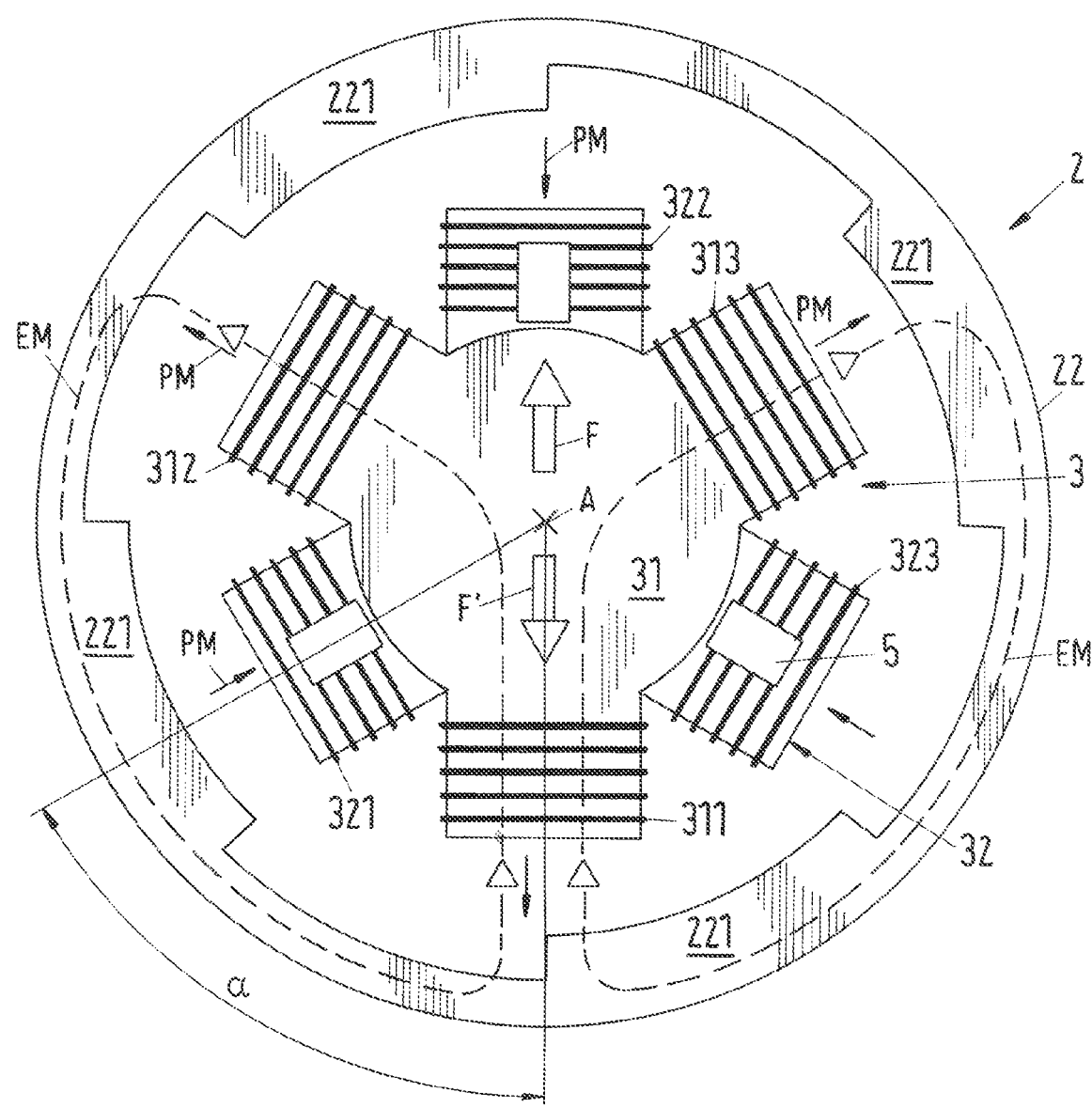
FIG. 5 is a plan view of the stator and of the magnetically active core of the rotor from the direction of the desired axis of rotation.

Since the rotor 2 is configured as a single-use part, it should be able to be manufactured as simply and inexpensively as possible. In the following, the design of the rotor 2 will be explained in more detail with reference to FIG. 2 and FIG. 3. The rotor 2 comprises the magnetically active core 22 and the impeller 21. For better understanding, a perspective sectional representation of the magnetically active core 22 of the rotor 2 and of the stator 3 is shown in FIG. 4 and a plan view of the stator 3 and the magnetically active core 22 of the rotor 2 is shown in FIG. 5.

The rotor 2 of the mixing apparatus 1 in accordance with the invention is configured as coil-free, i.e. no windings are provided on the rotor 2. In a very especially preferred embodiment of the invention, which is also realized in the embodiment described here, the rotor 2 or the magnetically active core 22 of the rotor 2 does not have any permanent magnets; it is therefore free of permanent magnets. This measure allows a particularly inexpensive embodiment of the rotor 2 as a single-use part since in particular no rare earths such as neodymium or samarium or compounds or alloys thereof are necessary which are frequently used for the manufacture of permanent magnets for the manufacture of the rotor 2.

The dispensing with of these permanent magnets also signifies a large advantage under environmental aspects.

Those ferromagnetic or ferrimagnetic materials which are magnetically hard, that is which have a high coercive field strength, are typically called permanent magnets. The coercive field strength is that magnetic field strength which is required to demagnetize a material. Within this application, a permanent magnet is understood as a material which has a coercive field strength, more precisely a coercive field strength of the magnetic polarization, which amounts to more than 10,000 A/m.

If the rotor 2 is therefore free of permanent magnets, this means that the magnetically active core 22 of the rotor only comprises materials whose coercive field strength amounts to at most 10,000 A/m.

The designation that the rotor 2 is "free of permanent magnets" should be understood within the framework of this application that the rotor 2 does not comprise any permanent magnets which make a substantial contribution to the drive field for driving the rotation of the rotor 2. It is naturally possible that other magnets or permanent magnets are provided at the rotor 2 which, for example, only serve for the detection of the angular position of the rotor or which otherwise satisfy a purpose which has nothing to do with the generation of the drive flux for the rotor. The designation "free of permanent magnets" therefore only relates to the drive of the rotor 2.

The designation "free of permanent magnets" with respect to the rotor is therefore to be understood within the framework of this application such that the rotor 2 is free of permanent magnets which make a contribution to the drive of the rotor or such that the rotor 2 is free of permanent magnets which contribute to the drive flux for the drive of the rotor 2.

The magnetically active core 22 of the rotor is preferably produced from a magnetically soft material, for example from iron, nickel iron or silicon iron. In this respect, the magnetically active core 22 can e.g. be manufactured by casting, stamping, pressing of magnetically soft powder with subsequent sintering, forging, shaping or assembling of parts such as metal sheets.

In the first embodiment, the magnetically active core 22 is configured as substantially of ring shape (see in particular FIG. 4), wherein a plurality of pronounced rotor poles 221 are provided distributed over the inner periphery of the ring-shaped core which extend radially inwardly. With respect to the axial direction, each rotor pole 221 extends over the total axial height of the ring-shaped magnetically active core 22. In the variant described here, the magnetically active core 22 has four rotor poles 221 which are distributed equidistantly over the inner periphery of the ring-shaped magnetically active core (see FIG. 5).

The rotor 2 furthermore has the impeller 21 having a plurality of blades 211 distributed over the periphery of the rotor 2 which can blend the substances in the mixing tank 71. The impeller 21 is arranged radially outwardly disposed with respect to the magnetically active core 22, wherein the blades 211 are arranged substantially at the same height with respect to the axial direction as the magnetically active core 22.

The rotor 2 is configured as an integral rotor because it is both the rotor 2 of the electromagnetic drive and of the magnetic bearing and the rotor 2 of the mixer. This offers the advantage of a very compact and space-saving design.

The magnetically active core 22 has a jacket 23 (see FIG. 2 and FIG. 3) which comprises a plastic and which completely surrounds the magnetically active core 22. The magnetically active core is preferably cast into a plastic which forms the jacket 23. The blades 211 can, for example, be placed onto the jacket 23 and can be fixed there by a clamping connection or can be adhesively bonded or welded to the jacket 23. It is also possible that the blades 211 are an integral component of the jacket 23.

Since the rotor 2 and the mixing tank 71 are designed as components of the single-use apparatus 70, the parts produced from plastic should be manufactured from a commercial plastic which is as inexpensive as possible. A further substantial aspect is that the single-use apparatus 70 or its components has to be able to be sterilized for certain fields of application. In this respect, it is particularly advantageous if the single-use apparatus 70 can be gamma sterilized. In this type of sterilization, the element to be sterilized is acted on by gamma radiation. The advantage of the gamma sterilization, for example in comparison with steam sterilization, in particular lies in the fact that the sterilization can also take place through the packaging. It is common practice especially with single-use parts that the parts are brought into the packaging provided for shipping after their manufacture and are then stored for some time before they are delivered to customers. In such cases, the sterilization takes place through the packaging only shortly before the delivery to the customer, which is not possible with a steam sterilization or with other methods.

The single-use apparatus 70, on the other hand, offers the great advantage due to its only single usability that no value has to be placed on a good cleaning capability of the single-use apparatus 70 in the construction because the single-use apparatus does not have to be cleaned when used as intended. It is furthermore not necessary as a rule that the single-use apparatus 70 or its components have to be sterilized more than once. This is in particular a great advantage with the gamma sterilization because the application of gamma rays to plastics can result in degradations so that a multiple gamma sterilization can make the plastic unusable.

Since as a rule a sterilization at high temperatures and/or at a high (steam) pressure can be dispensed with for single-use parts, less expensive plastics can be used, for example those which cannot withstand high temperatures or which cannot be exposed to high temperature values and high pressure values a multiple of times.

When taking all these aspects into account, it is therefore preferred to use those plastics for the manufacture of the single-use apparatus which can be gamma sterilized at least once. The materials should in this respect be gamma-stable for a dose of at least 40 kGy to allow a single-time gamma sterilization. In addition, no toxic substances should arise in the gamma sterilization. It is additionally preferred for all materials which come into contact with the substances to be mixed to satisfy USP Class VI standards.

The following plastics are, for example, preferred for the manufacture of the flexible mixing tank 71: Polyethylenes (PE), low density polyethylenes (LDPE), ultra low density polyethylenes (ULDPE), ethylene vinyl acetates (EVA), polyethylene terephthalates (PET), polyvinylchloride (PVC), polypropylenes (PP), polyurethanes (PU), silicones.

The following plastics are, for example, preferred for the manufacture of the bucket 75 and the parts of the rotor 2 comprising plastic, that is the impeller 21 and the jacket 23. Polyethylenes (PE), polypropylenes (PP), low density polyethylenes (LDPE), ultra low density polyethylenes (ULDPE), ethylene vinyl acetates (EVA), polyethylene terephthalates (PET), polyvinylchloride (PVC), polyvinylidene fluorides (PVDF), acrylonitrile butadiene styrenes (ABS), polyacrylics, polycarbonates (PC).

Less suitable materials or even unsuitable materials for the manufacture of the plastic parts of the single-use apparatus 70 are, for example, the materials polytetrafluroethylenes (PTFE) and perfluooralkoxy polymers (PFA) known under the brand name Teflon. There is namely the risk with these materials on gamma sterilization that hazardous gases arise such as fluorine which can then form toxic or harmful compounds such as hydrofluoric acid (HF).

The stator 3 of the reusable apparatus 50 will only be explained in more detail in the following with reference to FIGS. 2-5. The stator 3 is configured as a bearing and drive stator with which the rotor 2 can be driven magnetically contactlessly about the desired axis of rotation A in the operating state, that is it can be set into rotation—and can be supported magnetically contactlessly with respect to the stator 3. The stator 3 and the rotor 2 thus form an electromagnetic rotary drive which simultaneously allows a magnetic support of the rotor 2. This electromagnetic rotary drive is particularly preferably configured according to the principle of the bearingless motor. The term bearingless motor means that the rotor 2 is supported completely magnetically, with no separate magnetic bearings being provided. The stator 3 is configured for this purpose as a bearing and drive stator; it is therefore both the stator of the electric drive and the stator of the magnetic support. The stator in this respect comprises at least 3 windings in the present case with which a magnetic rotating field can be generated which, on the one hand, exerts a torque on the rotor 2 which effects its rotation and which, on the other hand, exerts a shear force on the rotor 2 which can be set as desired so that its radial position—that is its position in the radial plane—can be actively controlled or regulated. At least three degrees of freedom of the rotor 2 can thus be actively regulated. The rotor 2 is passively magnetically stabilized, that is cannot be controlled, by reluctance forces with respect to its axial deflection in the direction of the desired axis of rotation A. The rotor 2 can also likewise be stabilized—depending on the embodiment—passively magnetically with respect to the remaining two degrees of freedom, namely tilts with respect to the radial plane perpendicular to the desired axis of rotation A.

The bearingless motor can be configured as an internal rotor, that is with an inwardly disposed rotor and a stator arranged around it, or as an external rotor, that is with an inwardly disposed stator 2 and a rotor 3 arranged around it. In the first embodiment described here, the electromagnetic rotary drive is configured as an external rotor.

The stator 3 preferably comprises an upper stator part 31 having a plurality of pronounced upper poles 310 for carrying upper windings 311, 312, 313 as well as a lower stator part 32 having a plurality of pronounced lower poles 320 for carrying lower windings 321, 322, 323. The upper stator part 31 and the lower stator part 32 are arranged spaced apart from one another with respect to the axial direction. A permanent magnet 33 is provided between the upper stator part 31 and the lower stator part 32.

The axial spacing of the upper stator part 31 from the lower stator part 32 and the thickness of the upper and lower stator parts 31, 32 are preferably dimensioned such that the total axial height of the stator 3 is at least approximately the same height, and preferably is the same height, as the height of the magnetically active core 22 of the rotor 2 in the axial direction.

In the first embodiment described here and shown in FIGS. 1-5, the stator 3 comprises exactly three upper poles 310 and exactly three lower poles 320. The upper and lower stator parts 31, 32 are of substantially the same design and are each configured in substantially disk shape, with each pole 310, 320 extending outwardly from the central disk part in the radial direction. The upper and lower stator parts 31, 32 are each produced from a magnetically soft material, for example iron, and can also be configured as a metal sheet stator packet. The upper and lower stators parts 31, 32 are parallel with one another, with the permanent magnet 33 being arranged between them, said permanent magnet being configured in disk shape or in ring shape and connecting the lower stator part 32 to the upper stator part 31. The permanent magnet 33 is magnetized in the axial direction—from the bottom to the top in accordance with the illustration—as the arrows with the reference symbol M indicate. The outer diameter of the permanent magnet 33 is dimensioned such that it is preferably not larger, and is particularly preferably a little smaller, than the diameter of the central disk part of the upper or lower stator part 31, 32. That part of the upper or lower stator part 31, 32 is meant by the central disk part which remains when the poles 310 or 320 are imagined to be not there.

The substantially identical upper and lower stator parts 31 and 32 are arranged rotated relative to one another by an angle α with respect to the desired axis of rotation A in the variant of the first embodiment shown in FIGS. 1—5 (see FIG. 5) so that the upper poles 310, viewed in the axial direction, are each arranged in a gap between two adjacent lower poles 320. In the embodiment shown in FIGS. 1-5, the angle α amounts to 60° so that each upper pole 310 is arranged, viewed in the axial direction, exactly centrally between a respective two adjacent poles 320 of the lower stator part 32. Such a particularly symmetrical design can also be achieved for other numbers of stator poles 310, 320. If N designates the total number of all upper and lower poles 310, 320, the angle α for this symmetrical arrangement is determined according to the relationship α=360°/N.

This rotated arrangement of the upper stator part 31 relative to the lower stator part 32 in particular has the advantage that, with a smaller number of upper and lower poles 310, 320, for example with three or four respective lower and upper poles 310, 320, a force effect on the rotor 2 can be generated with one of the two stator parts 31 or 32 by the interplay of the two stator parts 31, 32 for each relative angular position of the rotor 2 toward the stator 3, whereas a torque can be generated on the rotor 2 with the other of the two stator parts 32 or 31 as will be explained further below.

A respective coil 321, 322, 323, 311, 312, 313 is provided as a winding on each of the lower and upper poles 320, 310 with which coils an electromagnetic rotating field can be generated which exerts a torque on the rotor 2. At the same time, a shear force which can be set as desired can be exerted on the rotor 2 by the coils 321, 322, 323, 311, 312, 313 according to the principle of the bearingless motor, by which shear force the position of the rotor 2 can be actively magnetically regulated in the radial plane.

Position sensors 5 are furthermore provided with which the radial position of the rotor 2—that is its position in the radial or x-y plane—can be determined. The position sensors 5 are preferably configured as Hall sensors or eddy current sensors and are in signal connection with a control and regulation device, not shown, via signal lines not shown in any more detail.

In the variant of the first embodiment shown in FIG. 2, a total of four position sensors 5 are provided which are arranged at the inner wall of the separating can 4 approximately at the center between the upper and lower stator parts 31, 32 and which are diametrically opposite one another pair-wise. In principle, two position sensors 5 are sufficient to determine the position of the rotor 2 in the x-y plane, namely one per coordinate direction. It is, however, preferred to provide four position sensors 5 in order thus to allow a more accurate determination of the position of the rotor 2 from the difference signal of the position sensors 5 oppositely disposed pair-wise.

A variant of the first embodiment is shown in FIG. 4 in which a different arrangement of the position sensors 5 is provided. In this variant, more than four position sensors 5 are arranged in the stator 3, approximately at the center between the upper and lower stator parts 31, 32, and preferably distributed equidistantly over the outer periphery of the permanent magnet 33. In this arrangement, at least five position sensors 5 are required, wherein an embodiment having six or eight position sensors 5 is preferred. Both the radial position of the rotor 22 and the angle of rotation of the rotor can be determined with the aid of the sensor signals with this arrangement of the position sensors 5. The position sensors 5 can, for example, be eddy current sensors, optical sensors, capacitive sensors or magnetic field sensors such as Hall sensors or GRM sensors. With magnetic field sensors, a small permanent magnet is preferably arranged behind the sensor if the scatter field of the permanent magnet 33 should not be sufficient.

For a better understanding, the extent of the permanent magnetic flux generated by the permanent magnet 5 is indicated schematically by the arrows provided with the reference symbol PM in FIGS. 4 and 5. The permanent magnet flux extends in the axial direction in accordance with the illustration (FIG. 4) upwardly through the permanent magnet 33, is then guided radially outwardly in the upper stator part 31 through the upper poles 310 into the magnetically active core 22, extends there in the axial direction in accordance with the illustration downwardly and is conducted at the lower axial end of the magnetically active core 22 radially inwardly into the lower poles 320 of the lower stator part 32 from where it is guided in the axial direction back into the permanent magnet.

The generation of a radially outwardly active shear force F' on the rotor 2 is illustrated with exemplary character for a rotary position of the rotor 2 relative to the stator 3 in FIG. 5. F designates the opposing force of equal amount which acts on the stator 3. For this purpose, beside the permanent magnetic flux which is indicated by the arrows having the reference symbol PM, the electromagnetic flux generated by the coils 311, 312, 313 arranged on the upper poles 310 is indicated by the lines with the reference symbols EM shown as chain-dotted lines.

As can be recognized, the permanent magnetic flux PM does not generate any resulting force on the rotor 2 due to the symmetrical force introduction. The electromagnetic flux EM generated using the coils 311, 312, 313 in this snapshot exits the stator 3 radially outwardly at the coils 312 and 313 and enters into the respective oppositely disposed rotor poles 221 in the rotor 2. The total electromagnetic flux EM then exits the rotor pole 221 at the coil 311 and is guided radially inwardly into the upper pole 310 which carries the coil 311. In sum, the radially outwardly acting shear force F thereby results on the stator 3 which is indicated by the arrow having reference symbol F in FIG. 5 and a shear force acting in the opposite direction on the rotor 2. It can be recognized with reference to this example how a shear force which can be set as desired can be generated on the rotor 2 by the stator 3, with which shear force the radial position of the rotor 2—that is its position in the radial plane—can be actively magnetically regulated. It can likewise be seen that the electromagnetic flux EM always leads, in addition to the region of the air gaps between the rotor and the stator, through magnetically soft material and not through the permanent magnet 33.

For the control of the coils 311, 312, 313, 321, 322, 323 for generating the electromagnetic rotating field, a setting device, not shown, is present which comprises an amplifier unit 8 (see FIG. 6, FIG. 7) and is controlled by the control and regulation device. There are a plurality of variants for the embodiment of the amplifier unit 8 of which two will be described in the following which are suitable for the first embodiment with the total of six coils 311, 312, 313, 321, 322, 323. It is advantageous in this respect if a respective separate power amplifier 81 is provided for each of the coils 311, 312, 313, 321, 322, 323, with which power amplifier the coil current or the coil voltage for this coil can be regulated independently of the coil currents or the coil voltages of the other coils.

In the following, reference will be made with exemplary character to the case that the respective coil current is regulated as a variable.

In the embodiment described here, reference is made to the case that each of the coils 311, 312, 313, 321, 322, 323 is respectively configured as exactly one discrete coil which per se forms an electrical phase. Such embodiments are naturally also possible in which some or each of the coils 311, 312, 313, 321, 322, 323 respectively comprise more than one discrete coil.

Since therefore six coils 311, 312, 313, 321, 322, 323 are provided in the embodiment described here which each belong to a separate electrical phase, a total of six power amplifiers 81 have to be provided in the amplifier unit 8.

Figure 6:
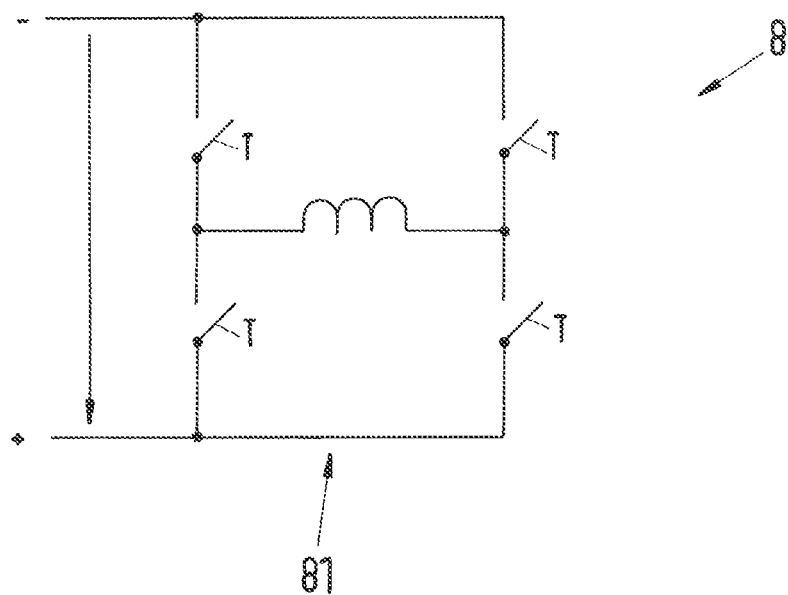
FIG. 6 is a schematic representation of an embodiment of a power amplifier for regulating the coil current or the coil voltage.

In the variant shown in FIG. 6, the amplifier unit 8 comprises a total of six power amplifiers 81, namely one for each electrical phase. Each power amplifier 81 is a bipolar power amplifier 81 which is respectively configured as an H bridge circuit in a manner known per se. Only one of these H bridge circuits is shown in FIG. 6 because the circuit diagrams of the other five have an identical appearance.

The name "bipolar power amplifier" means that both the phase currents and the phase voltages can each adopt a positive and a negative sign.

The H bridge circuits (see FIG. 6) are implemented in a manner known per se with switching transistors T and flyback diodes, not shown, and are operated at the operating potentials + and −. The operation potential − is the ground potential, for example.

Figure 7:
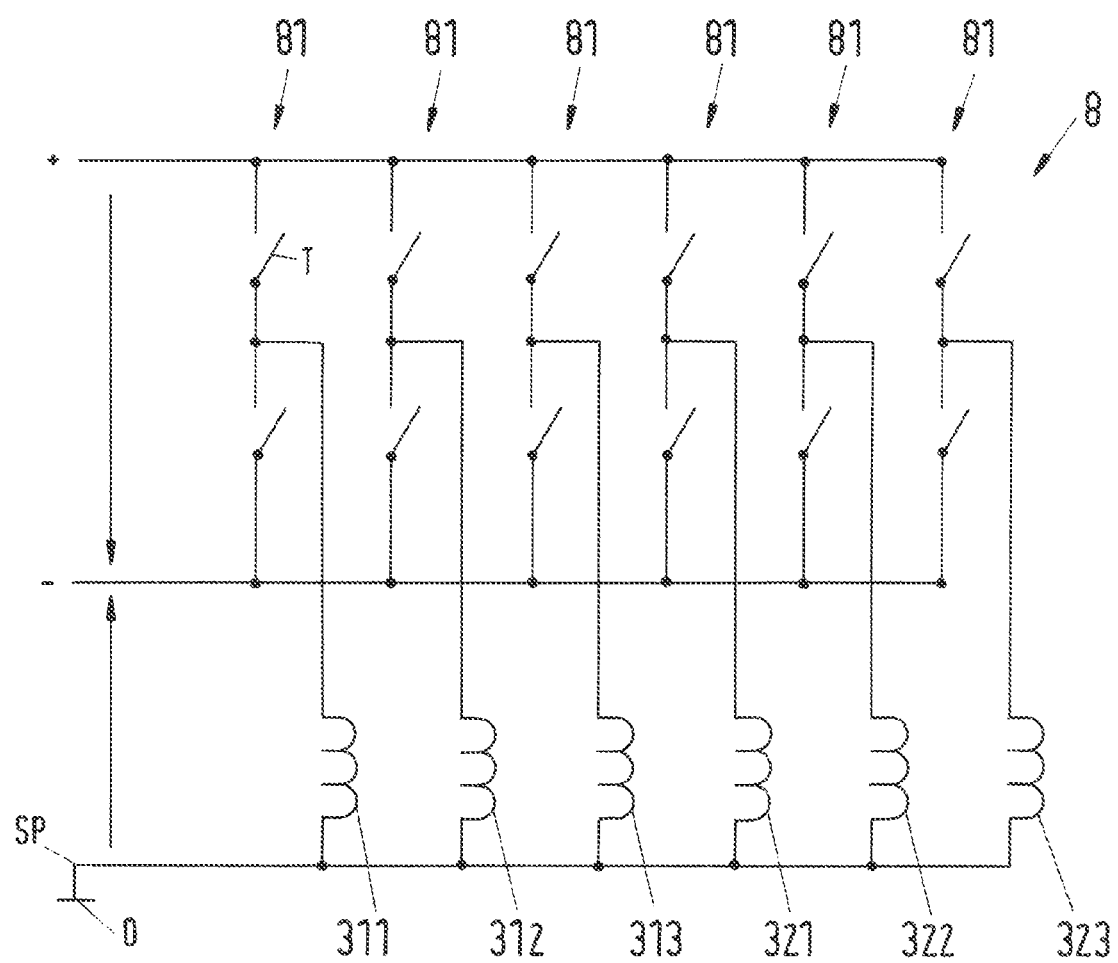
FIG. 7 is a schematic representation of a variant for the power amplifiers for regulating the six coil currents or coil voltages of the first embodiment.

FIG. 7 shows another variant for the power amplifier 81 of the amplifier unit 8 for the separate regulation of the coil currents (or coil voltages) in the coils 311, 312, 313, 321, 322, 323. In this variant, each of the six power amplifiers 81 is a respective bridge branch of the amplifier unit 8. A respective one bridge branch of the amplifier unit 8 is provided as a separate bipolar power amplifier 81 for each of the coils 311, 312, 313, 321, 322, 323 or for each of the separate electrical phases. Each bridge branch can supply one of the coils 311, 312, 313, 321, 322, 323 with the respective coil current or the respective coil voltage in a manner known per se by switching transistors T and flyback diodes (not shown). The amplifier unit 8 is operated at two operating potentials which are marked by + and − in FIG. 7. These operating potentials +, − are DC voltage potentials. The midpoint potential O, which is the ground potential, for example, lies between these two operating potentials. Each coil 311, 312, 313, 321, 322, 323 is connected on the one hand to the bipolar power amplifier 81 supplying it. On the other hand, each coil 311, 312, 313, 321, 322, 323 is connected to a common neutral point SP which lies on the midpoint potential O. The neutral point SP is preferably, but not necessarily, configured as a loadable neutral point SP, that is it is connected to a loadable potential so that, apart from the six coil currents, an additional current can flow off over the neutral point SP or can flow into it. This means that the usual neutral point condition that the sum of the coil currents at the neutral point SP always has to be zero is no longer necessary with this circuit. This has the consequence that each coil current can be regulated completely independently of the other coil currents.

Figure 8:
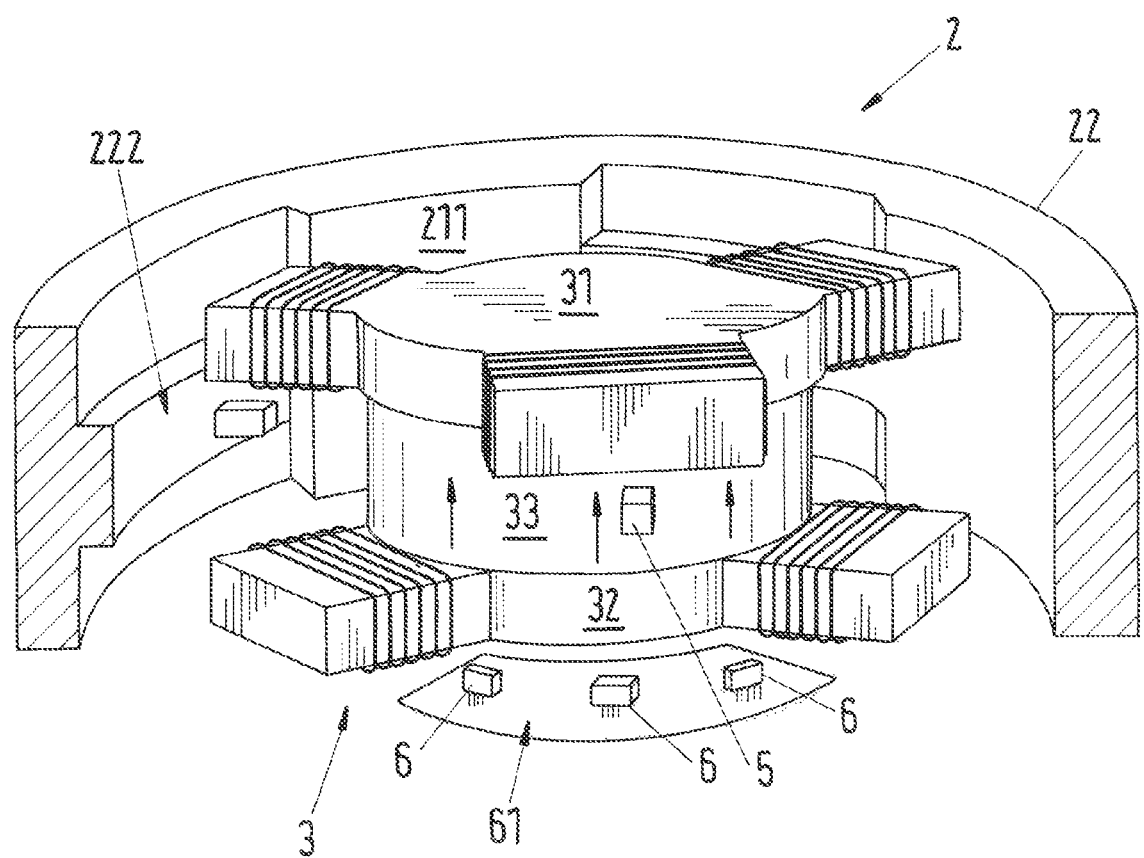
FIG. 8 is a perspective sectional representation of the stator and of the magnetically active core of the rotor for a first variant of the first embodiment with an alternative design of the magnetically active core of the rotor.

FIG. 8 shows in a perspective sectional representation of the stator 3 and of the magnetically active core 22 of the rotor 2 a first variant of the first embodiment with an alternative design of the magnetically active core 22 of the rotor 2. In this variant of the magnetically active core 22 of the rotor 2, it is also configured in substantially ring shape, wherein a peripheral ring 222 is provided at the center, however, (with respect to the axial direction) which has an inner diameter constant over the total periphery. The rotor poles—four here—are then provided above and beneath the rings 222 as already described.

This embodiment makes it possible to reduce the number of position sensors 5 in comparison with the variant shown in FIG. 4. It is possible in principle to manage with only two position sensors 5 in the embodiment with the cylindrical peripheral ring 222, namely one for each of the two Cartesian coordinate axes of the radial plane. To increase the accuracy of the position determination, however, it is also preferred here to provide a total of four position sensors 5 of which a respective two are arranged diametrically opposite one another pair-wise and then to use the respective difference signal of these two oppositely disposed position sensors 5 to determine the rotor position.

FIG. 8 furthermore shows three further sensors 6 which are used for the determination of the respective current rotary position of the rotor 2. The current angle of rotation (measured against any desired determinable zero angle) of the rotor 2 relative to the stator 3 can be determined with them. This angle of rotation is as a rule required for the regulation of the electromagnetic rotary drive in an embodiment in accordance with the principle of the bearingless motor. The three sensors 6 are, for example, arranged on an electronic print 61 arranged beneath the stator in accordance with the illustration. All three sensors 6 are arranged, viewed in the axial direction, in the same gap between two adjacent lower poles 320 of the lower stator part 32 and all have the same spacing from the desired axis of rotation A. The sensors 6 are preferably configured as Hall sensors or as eddy current sensors, with Hall sensors being preferred in a metallic configuration of the separating can 4. Depending on the configuration, the magnetic scatter field at the location of the sensors 6 is sufficient to determine the respective current value of the angle of rotation of the rotor 2. If this scatter field is not sufficient, each of the Hall sensors 6 can respectively be equipped with a small permanent magnet (not shown) which is, for example, adhesively bonded to the respective sensor 6.

It is understood that the arrangement described here for the determination of the current angle of rotation of the rotor 2 with the sensors 6 can also be implemented in the same manner or in analogously the same manner in all other variants and in all other embodiments.

Figure 9:
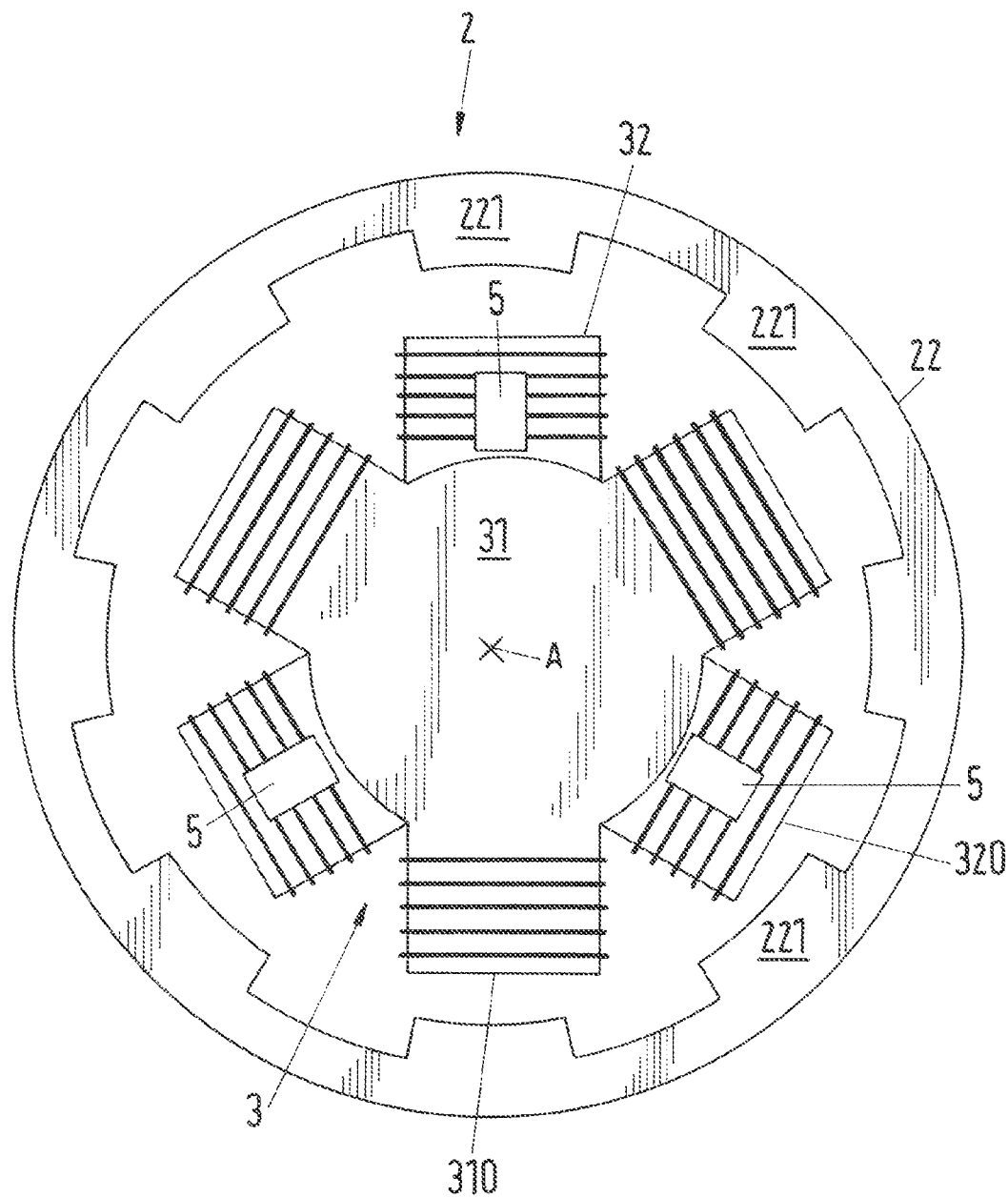
FIG. 9 is a plan view of the stator and of the magnetically active core of the rotor from the direction of the desired axis of rotation for a second variant of the first embodiment with an alternative design of the magnetically active core of the rotor.

FIG. 9 shows a plan view of the stator 3 and of the magnetically active core 22 of the rotor 2 from the direction of the desired axis of rotation A for a second variant of the first embodiment with an alternative design of the magnetically active core 22 of the rotor 2. In this variant, the magnetically active core 22 of the rotor 2 has a total of eight rotor poles 221 which are distributed equidistantly over the inner periphery of the magnetically active core 22 of the rotor 2 and which all have the same length measured in the peripheral direction. The magnetically active core 22 of the rotor can also have the peripheral ring 222 shown in FIG. 8 in this variant.

The increase in the number of rotor poles 221 to a number which does not correspond to a multiple of the number of poles 310 or 320 of the stator 3 has the advantage that the number of possible positions of engagement in which no resulting torque can be exerted by the stator 3 on the rotor 2 can in particular be considerably reduced or even brought to zero in those embodiments of the electromagnetic rotary drive which have a single-phase characteristic. The problem of the position of engagement or latch positions (or latch torques) is in particular known from the technology of single-phase motors. There are certain relative angular positions between the stator 3 and the rotor 2 in which no resulting torque can be effected on the rotor 2 by the stator 3. If such an angular position coincides with a latch position, that is a position in which the zero latch torque is at a maximum, the motor can no longer start up independently.

Figure 10:
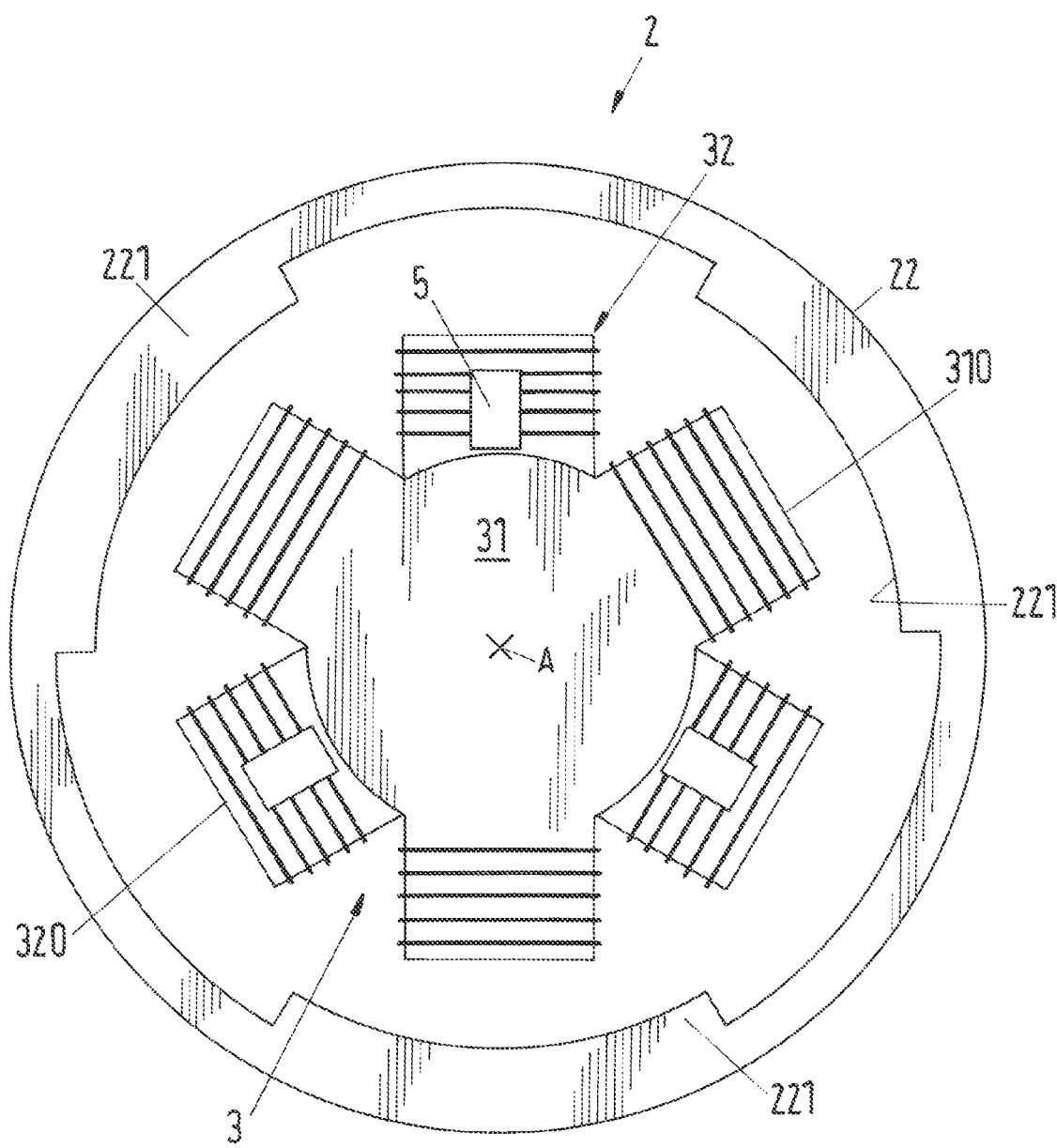
FIG. 10 is a plan view of the stator and of the magnetically active core of the rotor from the direction of the desired axis of rotation for a third variant of the first embodiment with an alternative design of the magnetically active core of the rotor.

FIG. 10 shows in a representation analog to FIG. 9 a plan view of the stator 3 and of the magnetically active core 22 of the rotor 2 from the direction of the desired axis of rotation A for a third variant of the first embodiment with an alternative design of the magnetically active core 22 of the rotor 2. In this variant, the magnetically active core 22 of the rotor 2 has a total of three rotor poles 221 which are distributed equidistantly over the inner periphery of the magnetically active core 22 of the rotor 2 and which all have the same length measured in the peripheral direction. The magnetically active core 22 of the rotor can also have the peripheral ring 222 shown in FIG. 8 in this variant. In embodiments in which the number of the rotor poles 221 coincides with the number of the upper poles 310 or lower poles 320 of the stator 3 or corresponds to a multiple of the number of these poles 310 or 320, magnetic radial forces can be generated in any angular position of the rotor 2. On the other hand, such embodiments are unfavorable with respect to torque formation if the rotary drive has single-phase characteristics since the positions of engagement of the rotor 2 coincide exactly with the angular positions in which no torque can be produced.

To be able to generate a start-up moment in the positions of engagement, it is advantageous in this respect for the rotor poles 221 to be configured or arranged at least slightly asymmetrically. There are a number of possibilities of achieving this asymmetry of which only some are mentioned by way of example here. It is thus possible, for example, not to distribute the rotor poles 211 exactly equidistantly over the periphery of the magnetically active core 22 or the lateral boundary edges of the rotor poles 211 can be configured asymmetrically, for example with different chamfers. It is also possible that the individual rotor poles 211 have at least slightly different lengths—measured in the peripheral direction. The extent of a rotor pole 211 can furthermore extend over its length viewed in the peripheral direction in the radial direction.

Figure 11:
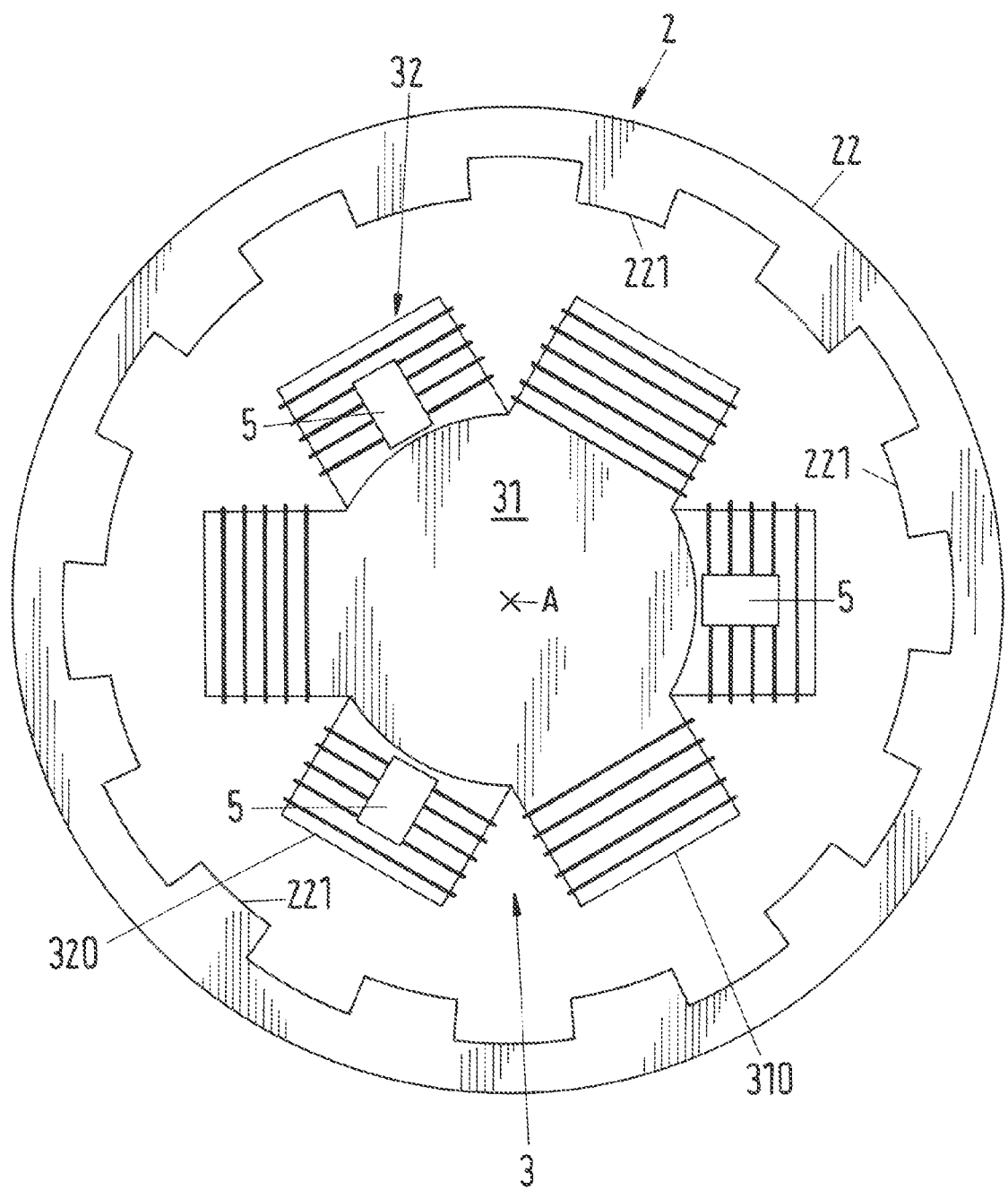
FIG. 11 is a plan view of the stator and of the magnetically active core of the rotor from the direction of the desired axis of rotation for a fourth variant of the first embodiment with an alternative design of the magnetically active core of the rotor.

FIG. 11 shows in a representation analog to FIG. 9 a plan view of the stator 3 and of the magnetically active core 22 of the rotor 2 from the direction of the desired axis of rotation A for a fourth variant of the first embodiment with an alternative design of the magnetically active core 22 of the rotor 2. In this variant, the magnetically active core 22 of the rotor 2 has a total of twelve rotor poles 221 which are distributed equidistantly over the inner periphery of the magnetically active core 22 of the rotor 2 and which all have the same length measured in the peripheral direction. The magnetically active core 22 of the rotor can also have the peripheral ring 222 shown in FIG. 8 in this variant.

The comparatively high number of twelve rotor poles 221 is in particular advantageous with respect to the radial force regulation since the influence of the rotor angle on the radial force amplitude decreases as the pole number increases. The symmetry of the arrangement is additionally of advantage with respect to the radial force regulation. Since the number of rotor poles 221, however, corresponds to a multiple of the number of the upper poles 310 and lower poles 320 of the stator 3 and since the rotary drive in accordance with the embodiment in FIG. 11 has single-phase characteristics, the positions of engagement also coincide with rotor angles here at which no torque can be achieved. Additional measures are also provided here so that the rotary drive can start up. In addition to the measures already discussed in connection with FIG. 10, the measured described in the following with reference to FIG. 12 can also be used in the embodiment of FIG. 11.

Figure 12:
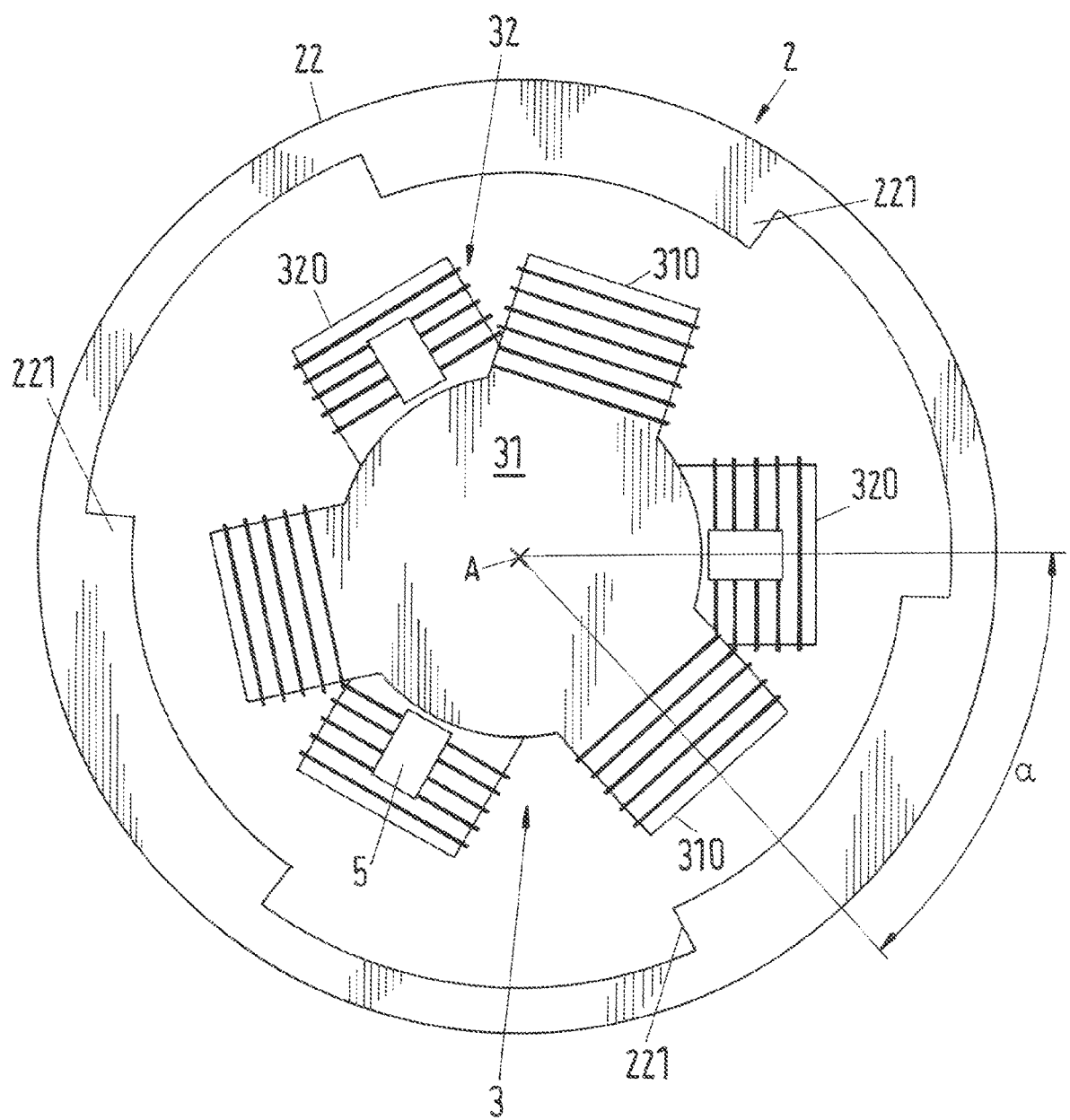
FIG. 12 is a plan view of the stator and of the magnetically active core of the rotor from the direction of the desired axis of rotation for a first variant of the first embodiment with an alternative design of the stator.

FIG. 12 shows a plan view of the stator 3 and of the magnetically active core 22 of the rotor 2 from the direction of the desired axis of rotation A for a first variant of the first embodiment with an alternative design of the stator 3. In this variant, the substantially identical upper and lower stator parts 31 and 32 are also arranged rotated by an angle α relative to one another with respect to the desired axis of rotation A so that the upper poles 310 are arranged, viewed in the axial direction, in each case between two adjacent lower poles 320. The angle α in the embodiment shown in FIG. 12, however, does not satisfy the condition α=360°/N, where N is the total number of all upper and lower poles 310, 320 (here therefore N=6) so that the upper poles 310 no longer lie exactly centrally between two adjacent lower poles 320. This has the consequence that, viewed in the axial direction, the upper poles 310 are admittedly still arranged in gaps between two adjacent lower poles 320, but the upper poles 310 and the lower poles 320 overlap a little, viewed in the axial direction. The angle α amounts to 45°, for example, in FIG. 12.

This is also an advantageous measure to ensure a starting up from positions of engagement, in particular when the rotary drive has a single-phase characteristic such as in the embodiment in accordance with FIG. 12.

Figure 13:
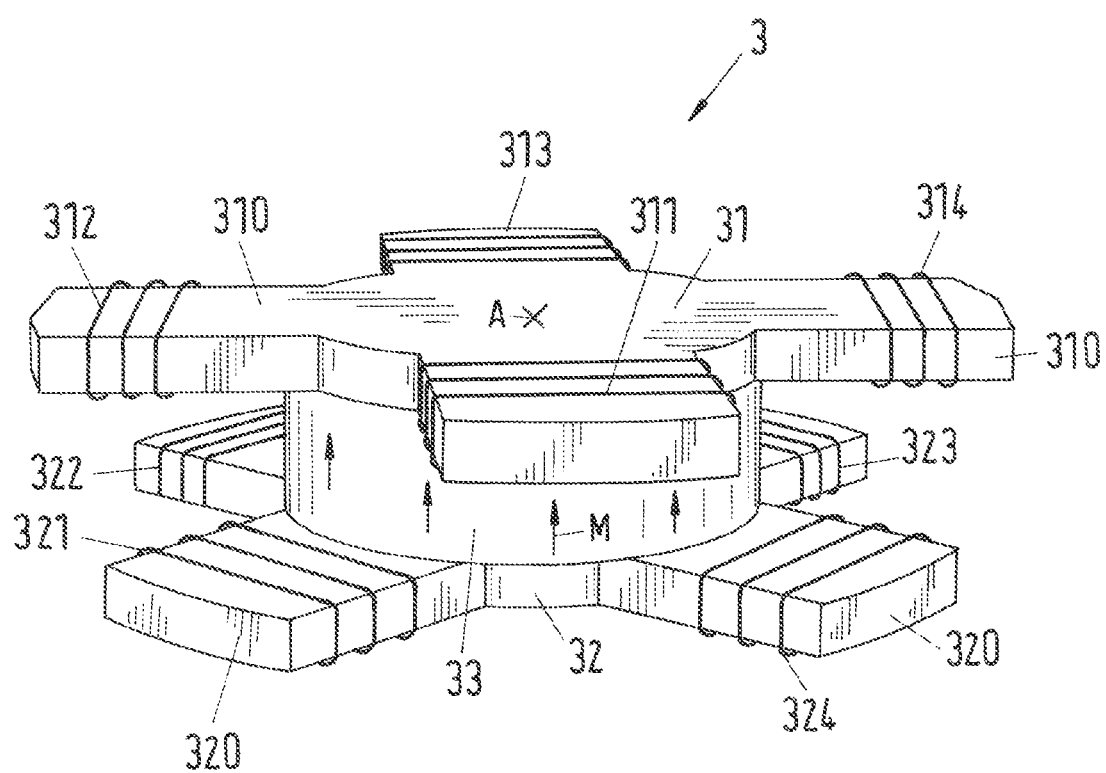
FIG. 13 is a perspective view of a second variant for the design of the stator of the first embodiment.

FIG. 13 shows in a perspective view a second variant for the configuration of the stator 3 of the first embodiment. In this variant, the upper stator part 31 has exactly four upper poles 310 of which each carries an upper coil 311, 312, 313, 314 as a winding. The lower stator part 32 has exactly four lower poles 320 of which each caries a lower coil 321, 322, 323, 324 as a winding. In this variant, the number of the upper poles 310 is also equal to the number of the lower poles 320, wherein here, however, the number of the upper poles 310 and the number of the lower poles 320 is respectively an even number, namely four. Both the upper poles 310 and the lower poles 320 are each arranged equidistantly with respect to the peripheral direction, that is the angle between adjacent poles 310, 320 amounts in each case to 90° both in the upper stator part 31 and in the lower stator part 32.

The substantially identically configured upper and lower stator parts 31 and 32 are arranged rotated relative to one another by an angle α=45° with respect to the desired axis of rotation A in the variant shown in FIG. 13 so that the upper poles 310, viewed in the axial direction, are each arranged in a gap between two adjacent lower poles 320. Since here the relationship α=360°/N is satisfied with N=8, each upper pole 310 is arranged, viewed in the axial direction, exactly centrally between two respective adjacent poles 320 of the lower stator part 32.

Figure 14:
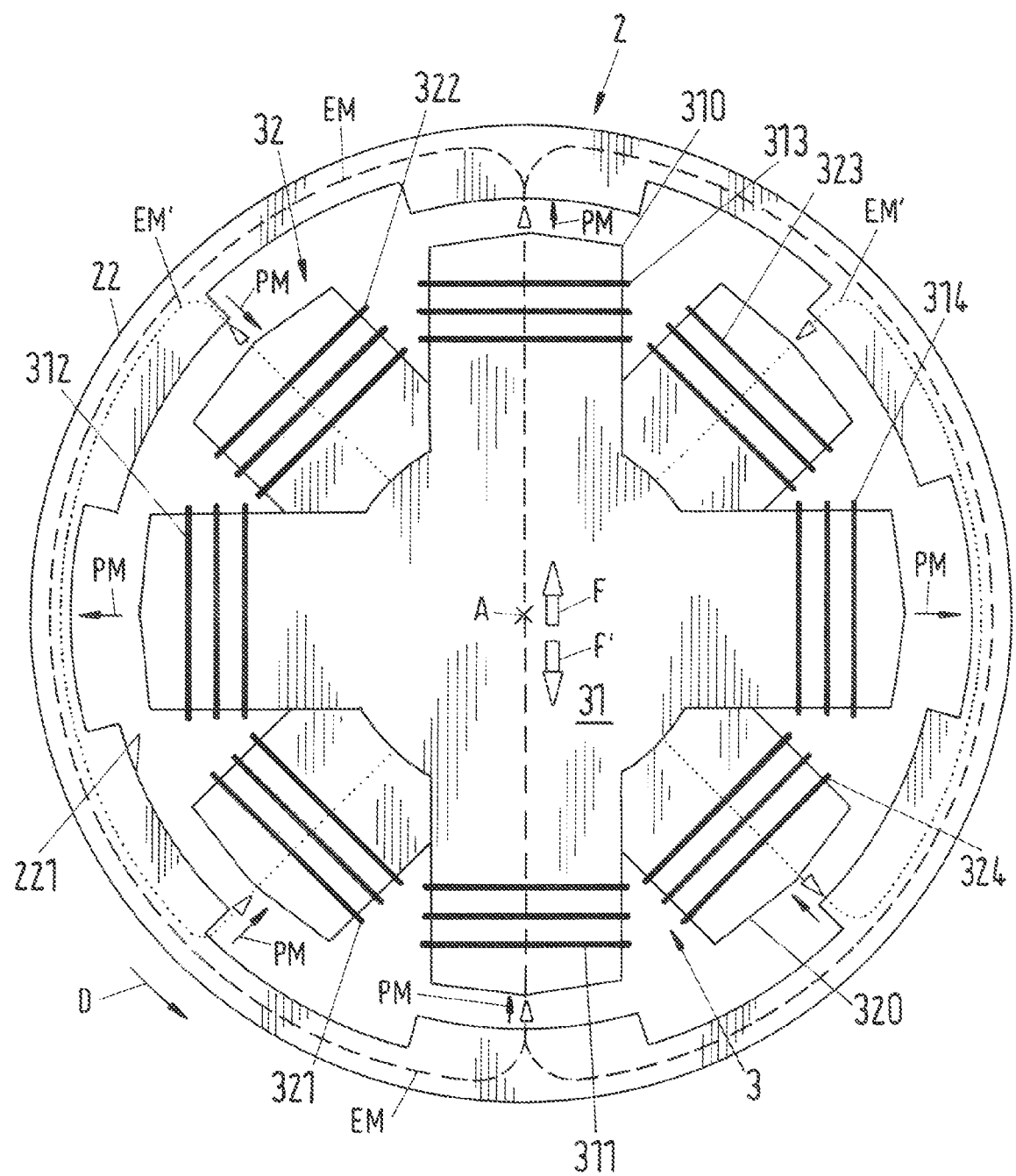
FIG. 14 is a plan view of the stator of FIG. 13 together with the magnetically active core of the rotor.

FIG. 14 shows a plan view of the stator 3 from FIG. 13 together with the magnetically active core 22 of the rotor 2 which has six rotor poles 221 here. The interplay of the two stator parts 31, 32 for the generation of force and torque on the rotor 2 will be explained with reference to FIG. 14. Since the permanent magnetic flow can be left out of consideration for this purpose, only the electromagnetic flux will be looked at in the following. FIG. 14 shows a snapshot of the rotary position of the magnetically active core 22 of the rotor 2 relative to the stator 3. The extent of the electromagnetic flux on the plane of the lower stator part 32 is indicated by the dotted lines having the reference symbol EM'; the extent of the electromagnetic flux on the plane of the upper stator part is indicated by the dashed line having the reference symbol EM. As can be recognized by the extent of the electromagnetic flux EM on the plane of the upper stator part 31, the upper stator part 31 generates a resulting force on the stator 3 which is indicated by the arrow F and which is directed radially outwardly as a shear force and an oppositely disposed force F' of equal size is corresponding directed to the rotor 2. However, no resulting torque is exerted on the rotor on this plane. It can equally be recognized that the electromagnetic flux EM' does not exert any resulting force on the rotor 2 on the plane of the lower stator part 32, but a resulting torque is exerted on the rotor 2 which is indicated by the arrow D. In this snapshot, the upper stator part the upper stator part therefore generates the shear force on the rotor 2, while the lower stator part 32 generates the torque D.

If the rotor 2 has rotated onward by 45°, the situation reverses; the lower stator part 32 then generates the force on the rotor and the upper stator part 31 effects the resulting torque. The setting device for controlling the stator 3 also comprises an amplifier unit 8 in the variant shown in FIG. 13 and FIG. 14, said amplifier unit having a separate power amplifier 81 for each of the eight coils 311, 312, 313, 314, 321, 322, 323, 324 and the coil current for each of the coils can be regulated by said power amplifier independently of the coil currents of the respective other coils.

As already explained in connection with FIG. 6, it is also possible here that each separate power amplifier is respectively configured as an H bridge circuit in accordance with FIG. 6, wherein eight H bridges are naturally then provided as power amplifiers 81 for the variant described here.

Figure 15:
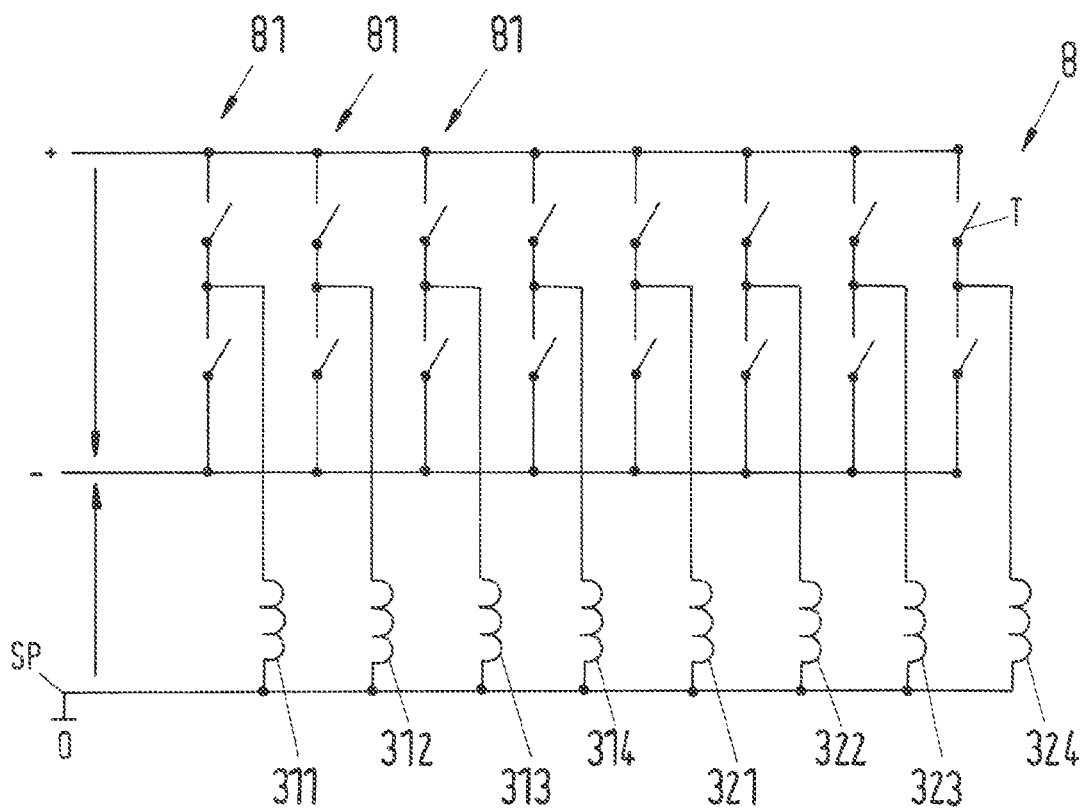
FIG. 15 is as FIG. 7, but for the stator in accordance with FIG. 13.

Alternatively, each power amplifier 81 can here also be configured as a respective bridge branch of an amplifier unit 8, in analogously the same manner as has been described in connection with FIG. 7. The corresponding circuit is shown in FIG. 15. The neutral point SP is here also preferably, but not necessarily, configured as a loadable neutral point.

In the variant shown in FIG. 13 or FIG. 14, it is also possible to connect two respective coils together to an electrical phase, whereby the number of required power amplifiers reduces because a separate power amplifier 81 is only required for each electrical phase.

The respective oppositely disposed coils are preferably connected together pairwise in each case in the upper stator part 31 and in the lower stator part 32. Due to the symmetry, the coil currents in the two coils forming a pair are then of equal and opposite amounts.

The following coil pairs are each connected together to form an electrical phase: In the lower stator part 32, the coil 321 is connected together with the coil 323 and the coil 322 with the coil 324. In the upper stator part 31, the coil 311 is connected together with the coil 313 and the coil 312 with the coil 314.

Figure 16:
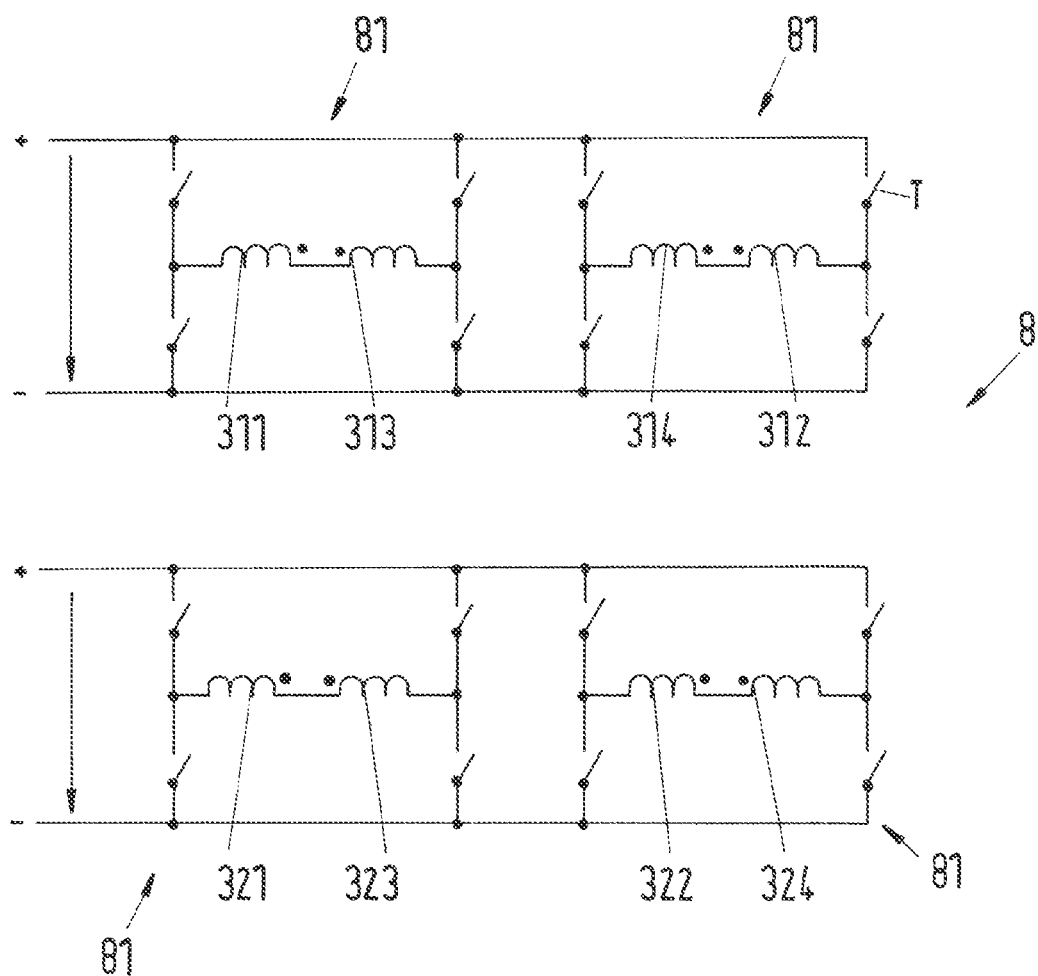
FIG. 16 is a schematic representation for a variant of the power amplifiers for regulating the coil currents or coil voltages of the stator in accordance with FIG. 13.
Figure 17:
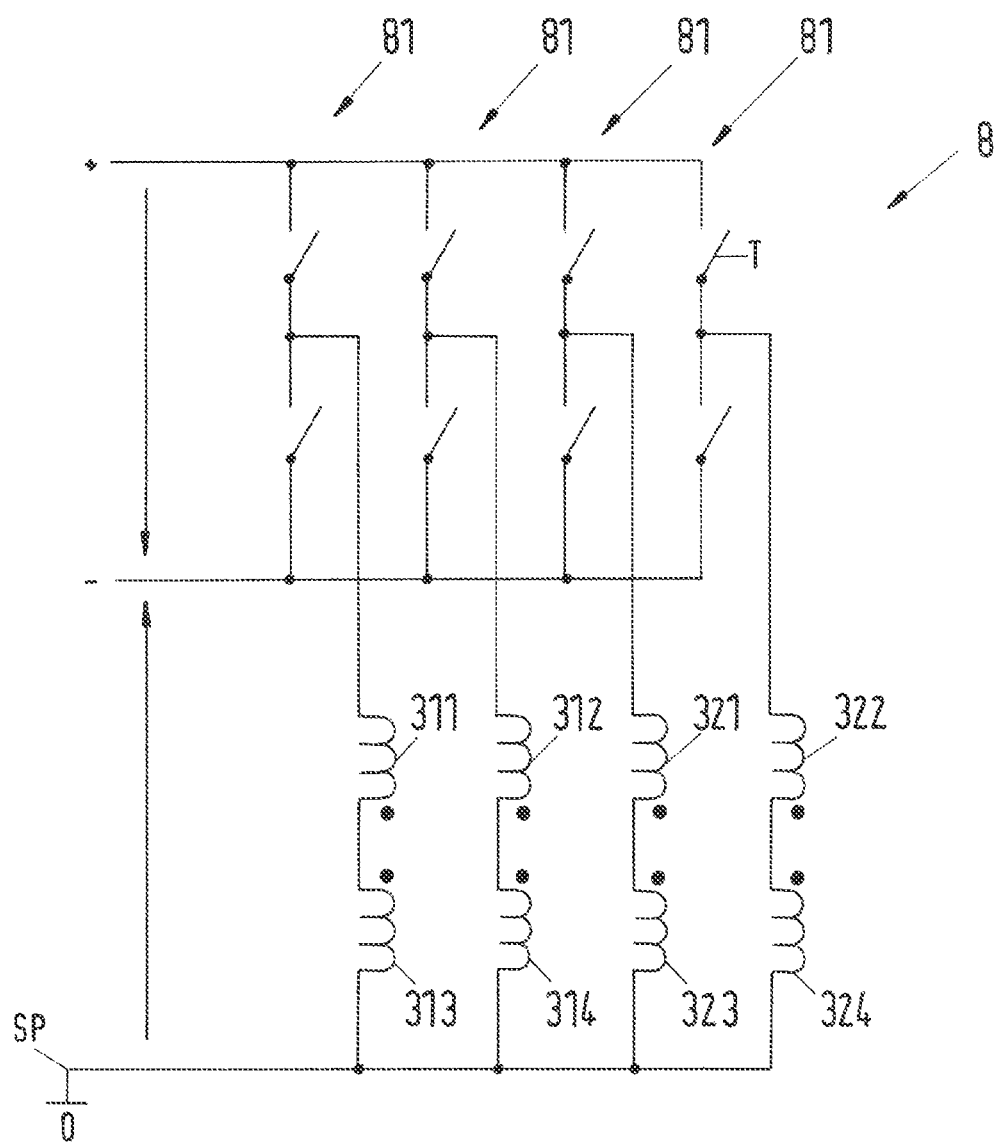
FIG. 17 is a schematic representation for a further variant of the power amplifiers for regulating the coil currents or coil voltages of the stator in accordance with FIG. 13.

The corresponding circuit diagram with the separate power amplifiers 81 for each electrical phase is shown in FIG. 16 for the variant with H bridge circuits for the separate power amplifiers 81 and in FIG. 17 for the variant with bridge branches. In the circuit shown in FIG. 17, however, it is now necessary that the neutral point SP is loadable.

Figure 18:
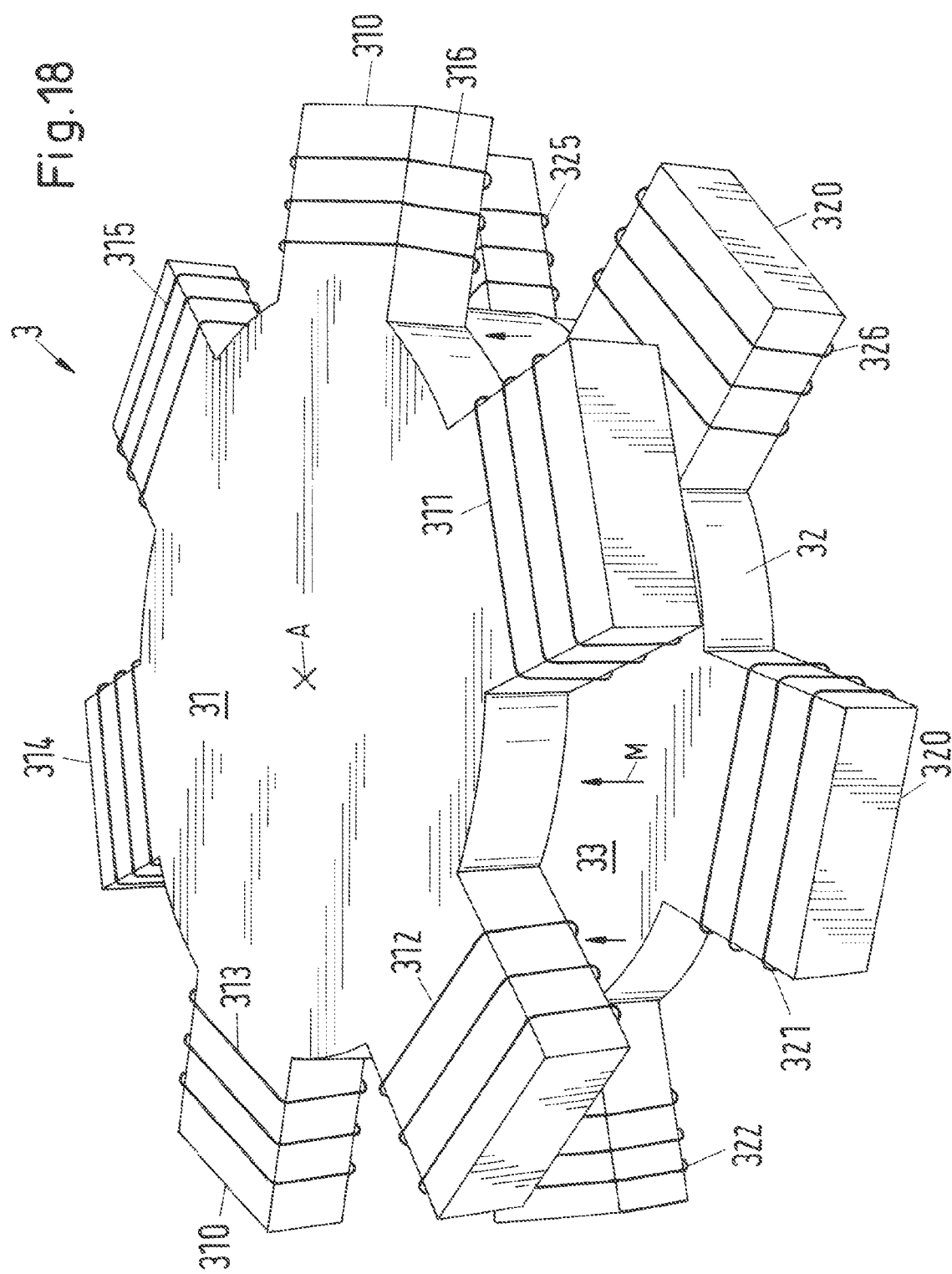
FIG. 18 is a perspective view of a third variant for the design of the stator of the first embodiment.

FIG. 18 shows in a perspective view a third variant for the configuration of the stator 3 of the first embodiment. For a better understanding, FIG. 19 shows a plan view from an axial direction of the stator 3 of FIG. 18 together with the magnetically active core 22 of the rotor 2.

In this variant, the upper stator part 31 has exactly six upper poles 310 of which each carries an upper coil 311, 312, 313, 314, 315, 316 as a winding. The lower stator part 32 has exactly six lower poles 320 of which each caries a lower coil 321, 322, 323, 324, 325, 326 as a winding. In this variant, the number of the upper poles 310 is also equal to the number of the lower poles 320, wherein here the number of the upper poles 310 and the number of the lower poles 320 is respectively an even number, namely six. Both the upper poles 310 and the lower poles 320 are each arranged equidistantly with respect to the peripheral direction, that is the angle between adjacent poles 310, 320 amounts in each case to 60° both in the upper stator part 31 and in the lower stator part 32.

Figure 19:
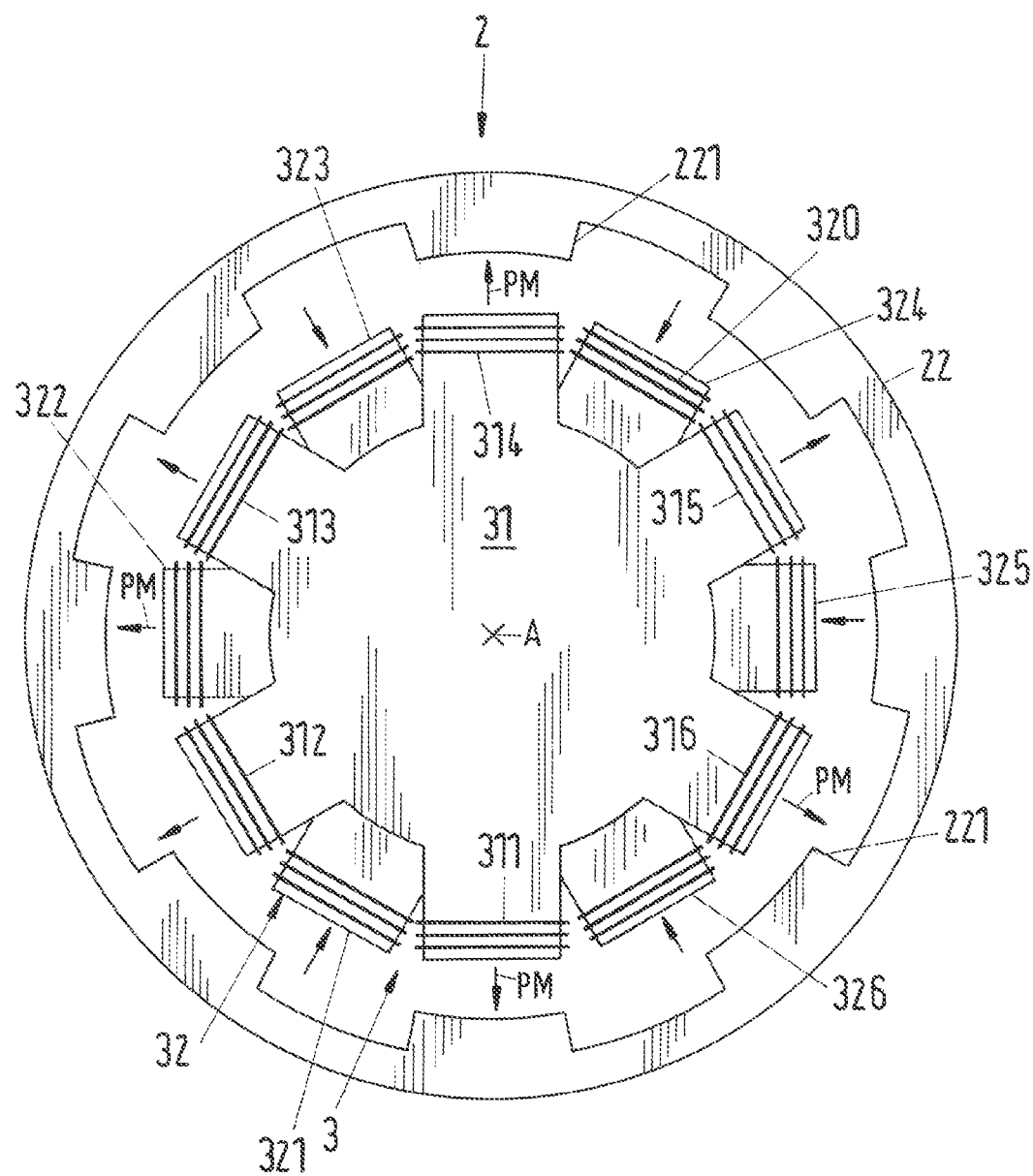
FIG. 19 is a plan view of the stator from FIG. 18.

The substantially identically configured upper and lower stator parts 31 and 32 are arranged rotated relative to one another by an angle $\alpha=30°$ with respect to the desired axis of rotation A in the variant shown in FIG. 18 and FIG. 19 so that the upper poles 310, viewed in the axial direction, are each arranged in a gap between two adjacent lower poles 320. Since here the relationship $\alpha=360°/N$ is satisfied with N=12, each upper pole 310 is arranged, viewed in the axial direction, exactly centrally between two respective adjacent poles 320 of the lower stator parts 32.

The setting device for controlling the stator 3 also comprises an amplifier unit 8 in the variant shown in FIG. 18 and FIG. 19, said amplifier unit having a separate power amplifier 81 for each of the twelve coils 311, 312, 313, 314, 315, 316, 322, 323, 324, 325, 326 and the coil current for each of the coils can be regulated by said power amplifier independently of the coil currents of the respective other coils.

As already explained in connection with FIG. 6, it is also possible here that each separate power amplifier is respectively configured as an H bridge circuit in accordance with FIG. 6, wherein twelve H bridges are naturally then provided as power amplifiers 81 for the variant described here.

Figure 20A:
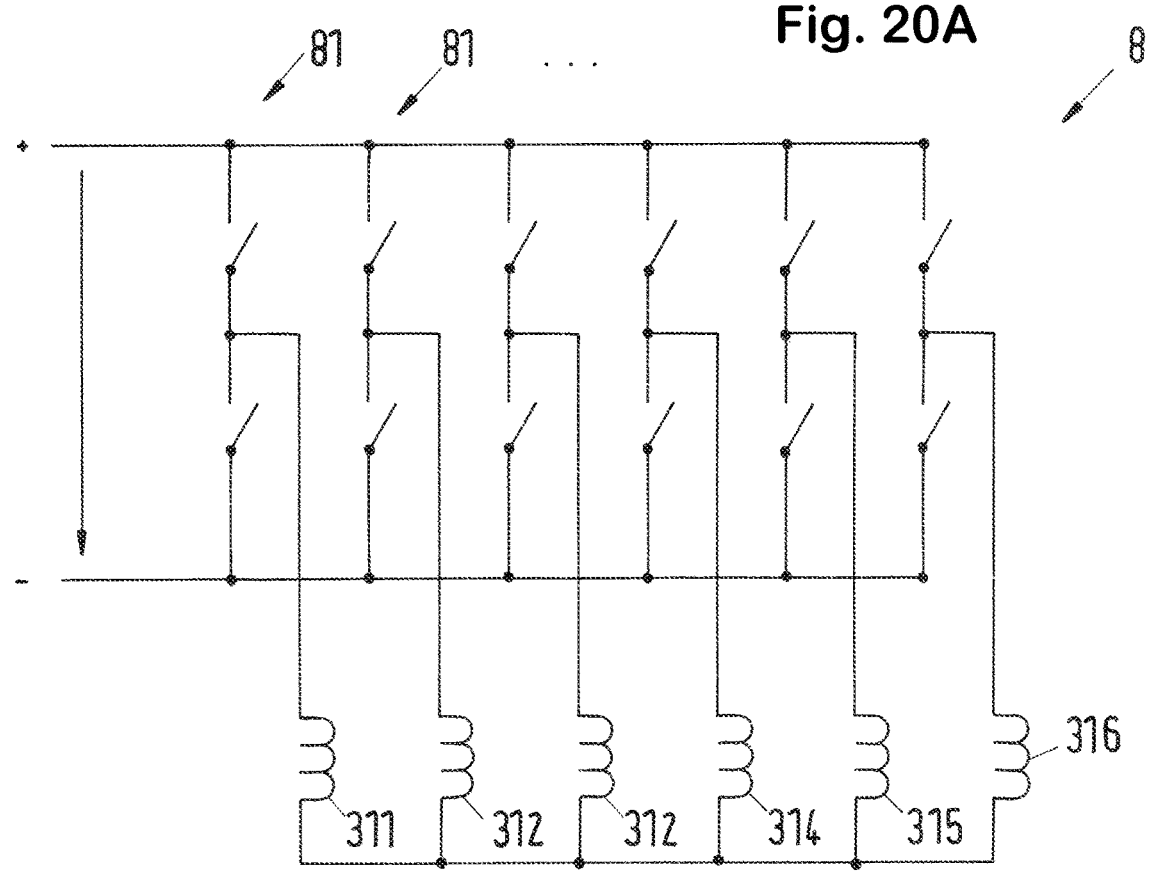
FIG. 20A and FIG. 20B are as FIG. 15, but for the stator in accordance with FIG. 19.
Figure 20B:
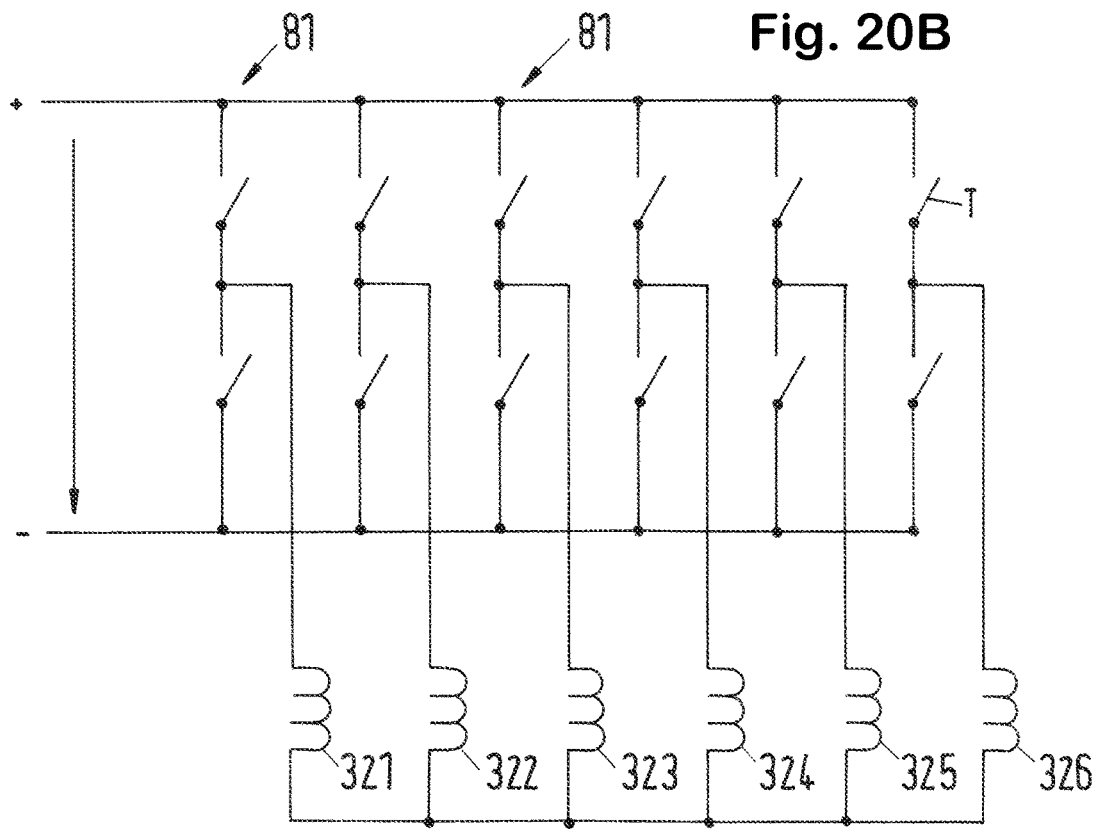

Alternatively, each power amplifier 81 can here also be configured as a respective bridge branch of an amplifier unit 8, in analogously the same manner as has been explained in connection with FIG. 7. The corresponding circuit is shown in FIG. 20A and FIG. 20B. The neutral point SP is here also preferably, but not necessarily, configured as a loadable neutral point.

In the variant shown in FIG. 18 or FIG. 19, it is also possible to connect two respective coils together to an electrical phase, whereby the number of required power amplifiers reduces because a separate power amplifier 81 is only required for each electrical phase.

The respective oppositely disposed coils are preferably connected together pairwise in each case in the upper stator part 31 and in the lower stator part 32. The following coil pairs are each connected together to form an electrical phase: In the lower stator part 32, the coil 321 is connected together with the coil 324, the coil 322 to the coil 325 and the coil 323 to the coil 326. In the upper stator part 31, the coil 311 is connected together with the coil 314, the coil 312 to the coil 315 and the coil 313 to the coil 316.

Figure 21:
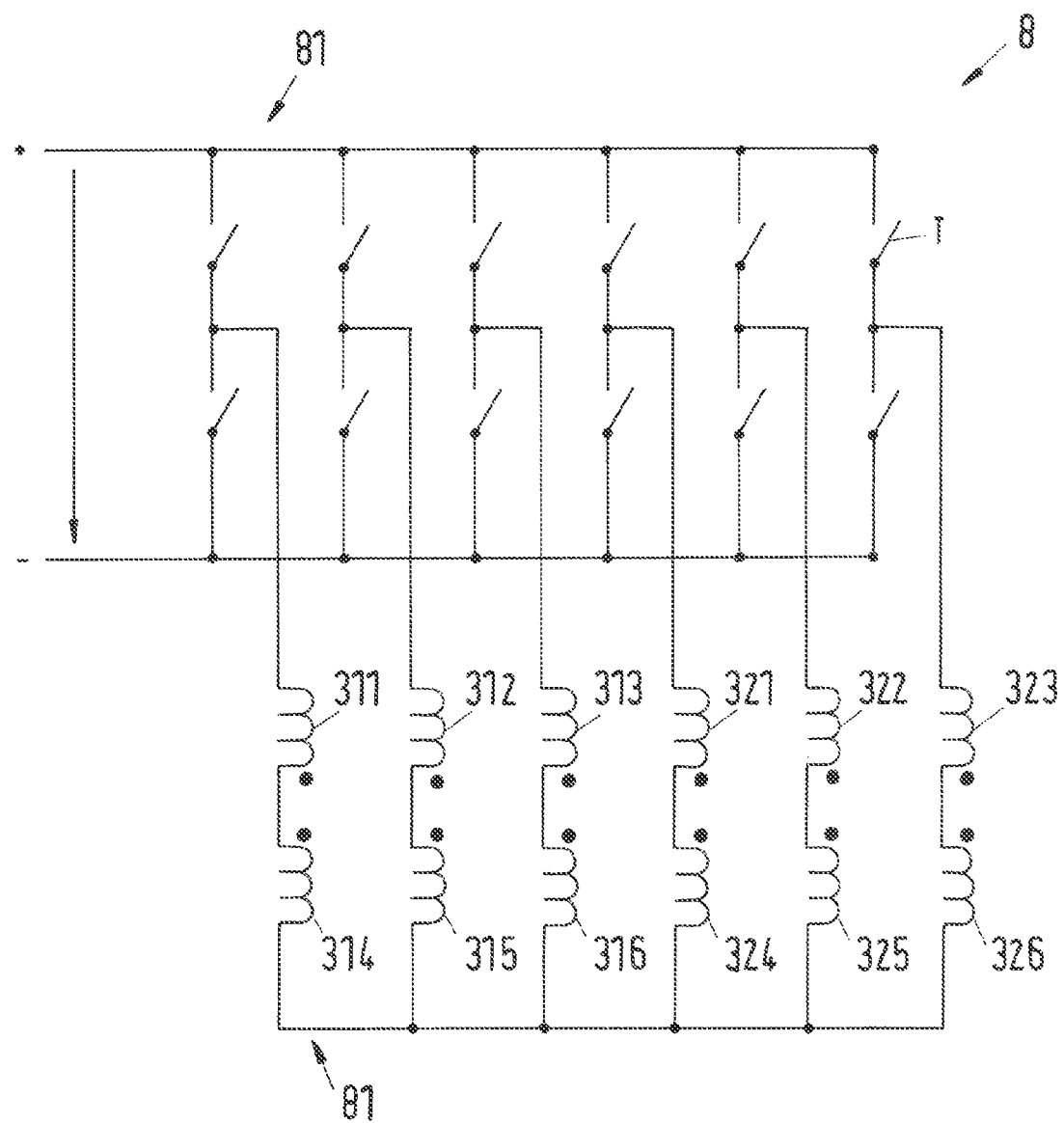
FIG. 21 is as FIG. 17, but for the stator in accordance with FIG. 19.

The corresponding circuit diagram with the separate power amplifiers 81 for each electrical phase is shown in FIG. 21 for the variant with bridge branches. In the circuit shown in FIG. 21, it is advantageous, but not necessary that the neutral point SP is loadable.

Figure 22:
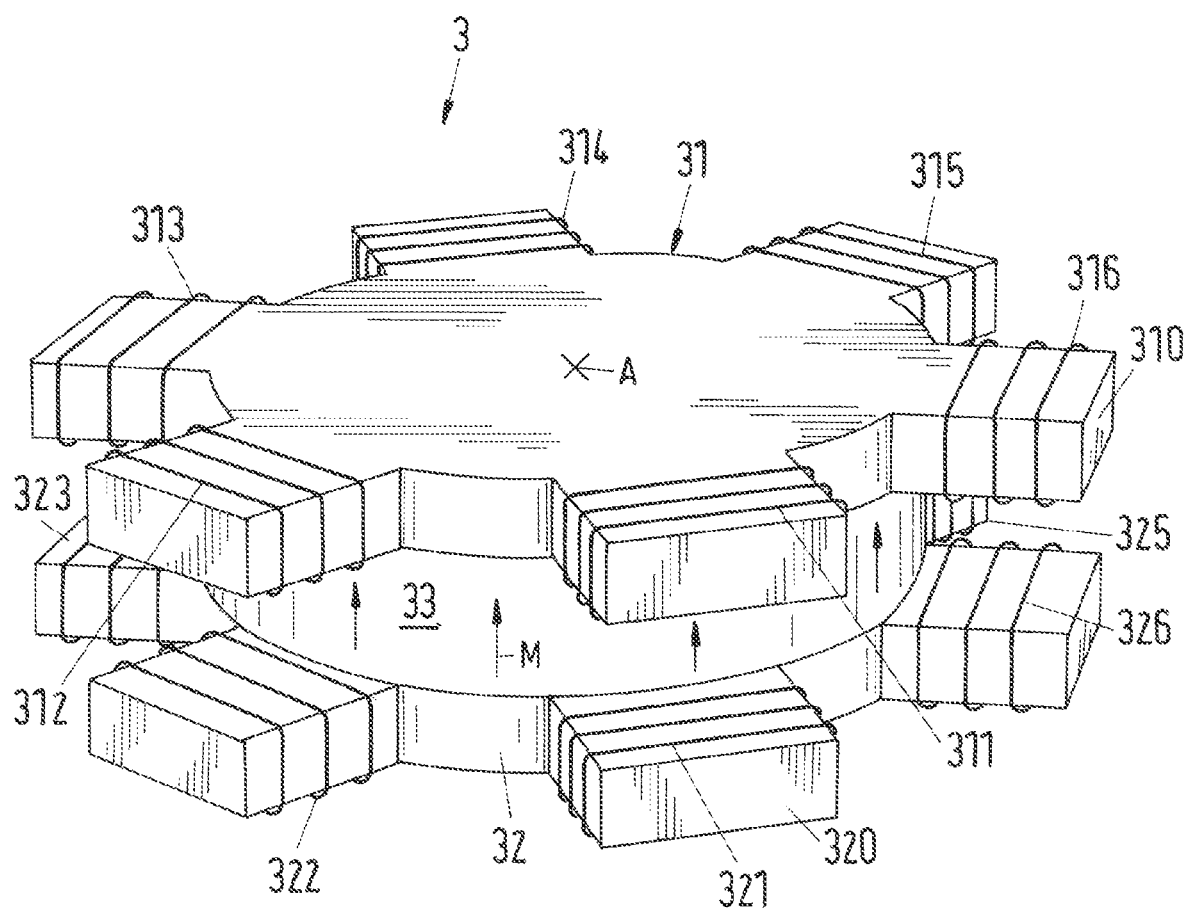
FIG. 22 is a perspective view of a fourth variant for the design of the stator of the first embodiment.

FIG. 22 shows in a perspective view a fourth variant for the configuration of the stator 3 of the first embodiment. For a better understanding, FIG. 23 shows a plan view from an axial direction of the stator 3 of FIG. 22 together with the magnetically active core 22 of the rotor 2.

In this variant, the upper stator part 31 also has exactly six upper poles 310 of which each carries an upper coil 311, 312, 313, 314, 315, 316 as a winding. The lower stator part 32 has exactly six lower poles 320 of which each caries a lower coil 321, 322, 323, 324, 325, 326 as a winding. In this variant, the number of the upper poles 310 is also equal to the number of the lower poles 320, wherein the number of the upper poles 310 and the number of the lower poles 320 is respectively an even number, namely six. Both the upper poles 310 and the lower poles 320 are each arranged equidistantly with respect to the peripheral direction, that is the angle between adjacent poles 310, 320 amounts in each case to 60° both in the upper stator part 31 and in the lower stator part 32.

Figure 23:
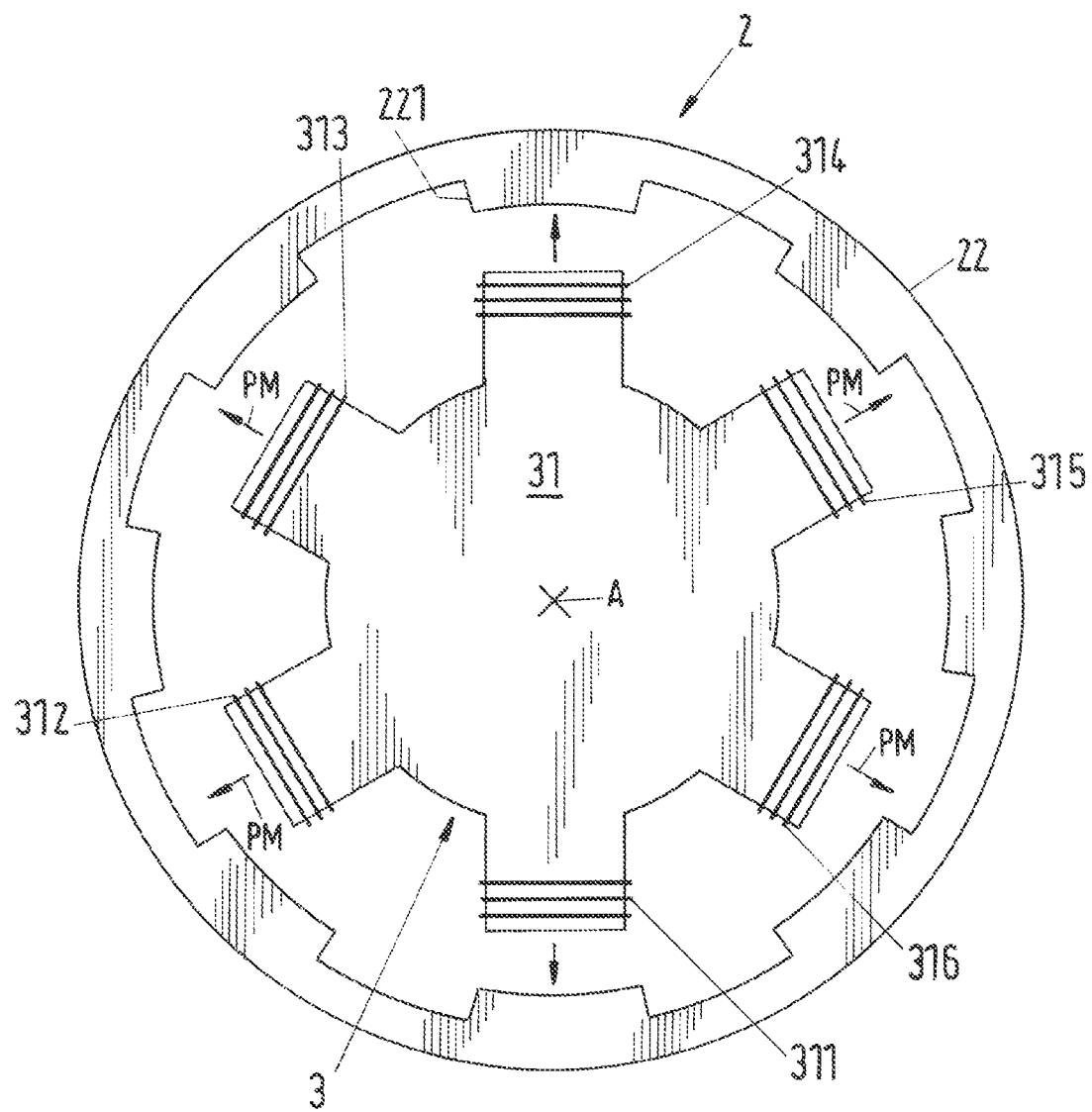
FIG. 23 is a plan view of the stator of FIG. 22 together with the magnetically active core of the rotor.
Figure 24:
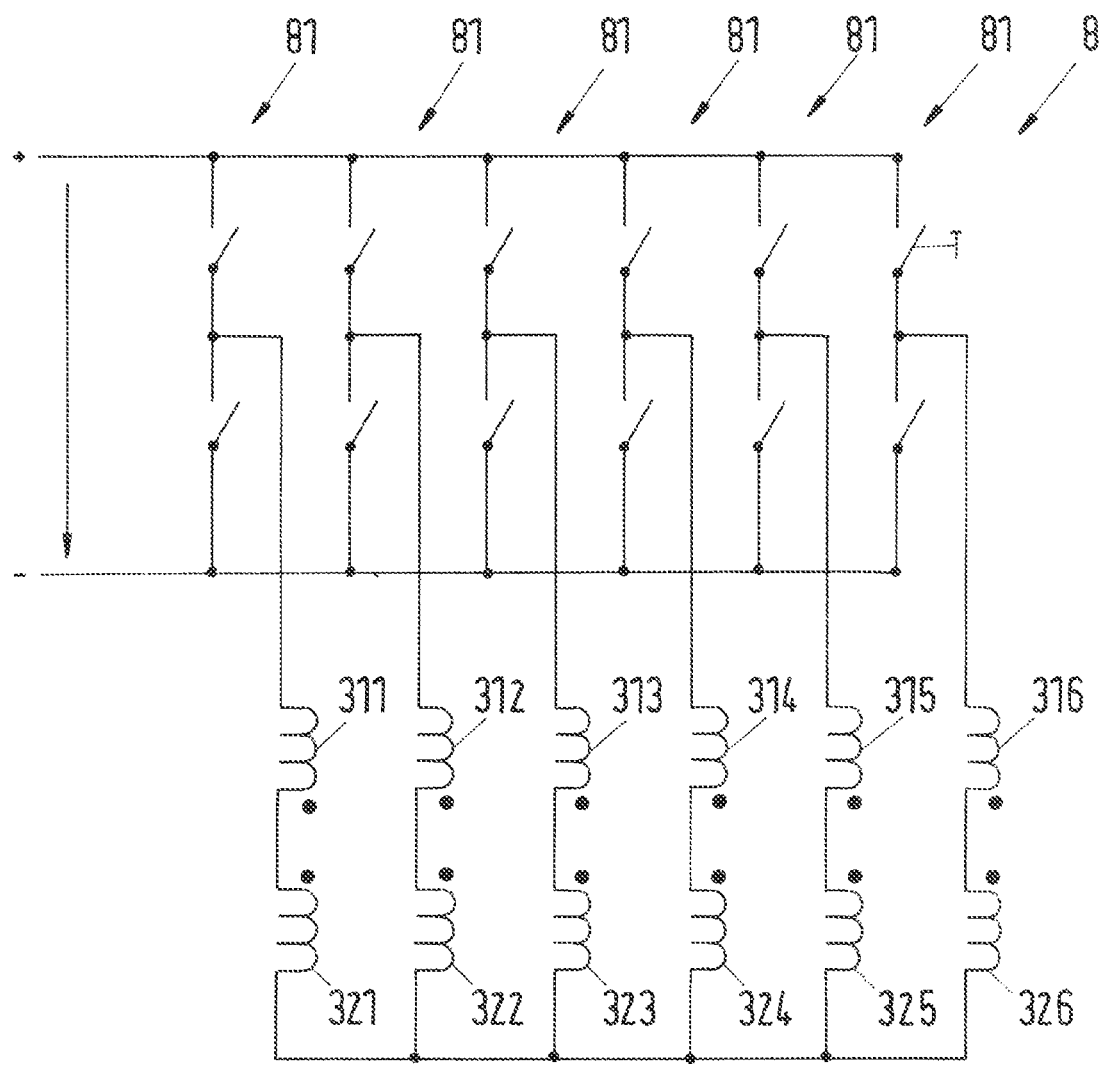
FIG. 24 is as FIG. 21, but for the stator in accordance with FIG. 23.

The substantially identically configured upper and lower stator parts 31 and 32 are not rotated relative to one another with respect to the desired axis of rotation A in the variant shown in FIG. 22 and FIG. 23, that is the angle α is equal to 0°. The upper poles 310 and the lower poles 320 are consequently arranged such that they overlap viewed in the axial direction. It is possible in this embodiment of the stator 3 also to stabilize the rotor 3 actively magnetically against tilts toward the radial plane so that now these two degrees of freedom of the tilt can also be actively magnetically regulated. It is, however, necessary for this purpose that the coil current for each of the total twelve coils can be respectively regulated independently of the coil current for the other coils.

In the variant shown in FIG. 22 or FIG. 23, it is also possible to connect two respective coils together to an electrical phase, whereby the number of required power amplifiers reduces because a separate power amplifier 81 is only required for each electrical phase. In addition to the above-described connecting together of two respective coils of the upper or of the lower stator part 31, 32, it is also possible in the variant shown in FIG. 22 and FIG. 23 to connect together a respective coil of the lower stator part 32 with a coil of the upper stator part 31. In this respect, the coils respectively lying above one another with respect to the axial direction are connected together. The coil 311 is then therefore connected to the coil 321, the coil 312 to the coil 322, the coil 312 to the coil 323, the coil 314 to the coil 324, the coil 315 to the coil 325 and the coil 316 to the coil 326.

The corresponding circuit diagram with the separate power amplifiers 81 for each electrical phase is shown in FIG. 21 for the variant with bridge branches. In the circuit shown in FIG. 21, it is advantageous, but not necessary, that the neutral point SP is loadable.

On the connecting together of two respective coils, only a connecting together of the coils in series is described above. It is, however, understood that the coils can also be connected together in a parallel circuit.

Figure 25:
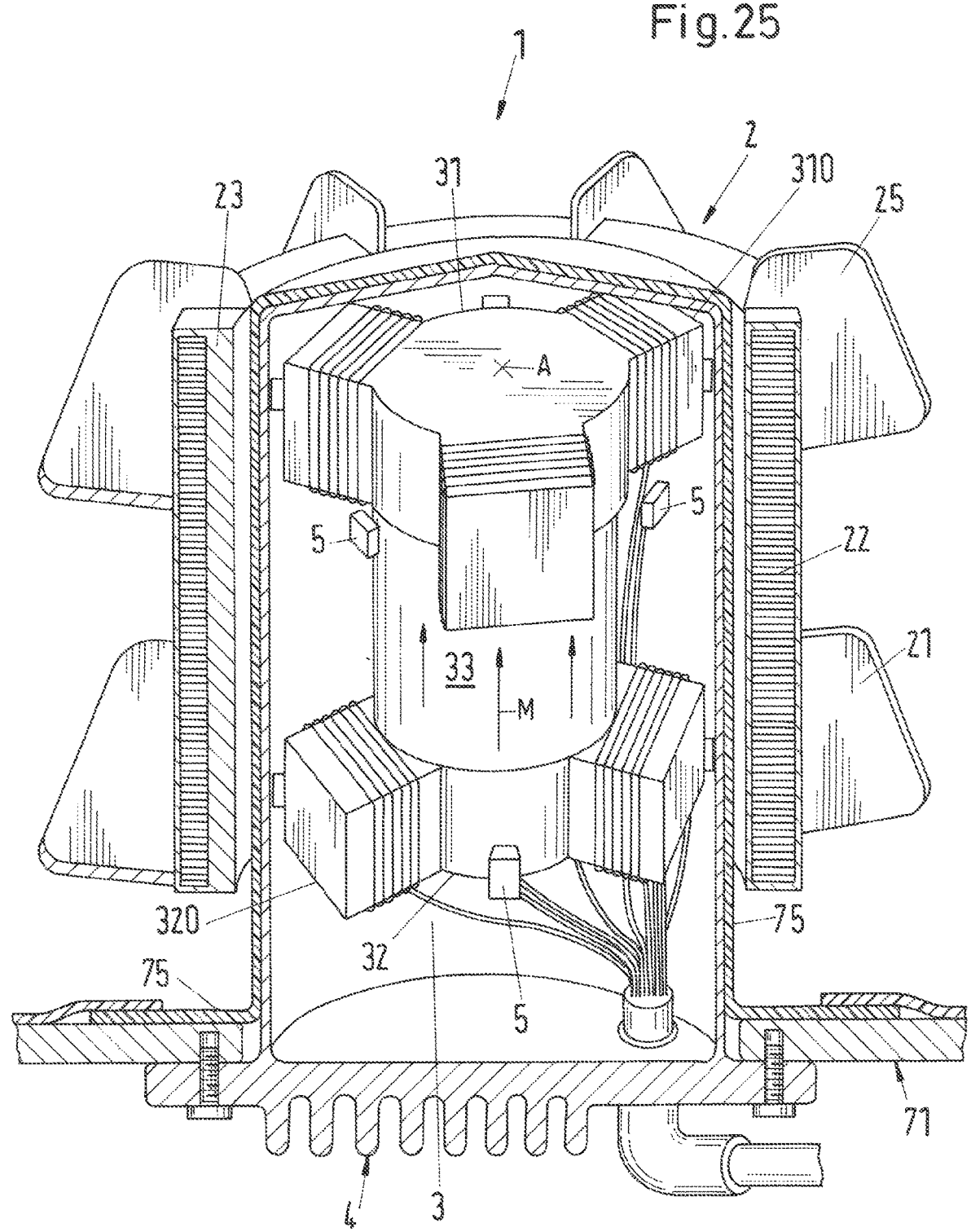
FIG. 25 is a perspective sectional representation of a second embodiment of a mixing apparatus in accordance with the invention in an analog representation to FIG. 2.

FIG. 25 shows in a representation analog to FIG. 2 a perspective sectional representation of a second embodiment of a mixing apparatus 1 in accordance with the invention. In the following, only the differences from the above-described first embodiment will be looked at. The reference numerals in particular have the same meaning as has already been explained in connection with the first embodiment. It is understood that all above-described variants, embodiments and measures can also be realized in the same manner or in analogously the same manner in the second embodiment.

In the embodiment provided in FIG. 25, the rotor 2 has two impellers 21, 25 for mixing the substances which are arranged spaced apart from one another with respect to the axial direction. Both impellers 21 and 25 are components of the only rotor 3 and are each provided radially outwardly disposed at the magnetically active core 22 of the rotor.

In comparison with the first embodiment, the stator 3 in the second embodiment has a greater height in the axial direction. This can be implemented, for example, in that the extent of the permanent magnet 33 of the stator 3 is increased in the axial direction so that the spacing between the lower stator part 32 and the upper stator part thus also increases or in that the axial height of the lower and/or upper stator part 32, 31 is increased, or by a combination of these two measures. The rotor 2 and the stator 3 are preferably configured such that the one impeller 21 is arranged at the same height (in the axial direction) as the lower stator part 32 in the operating state and the other impeller 25 is arranged at the same height as the upper stator part 32.

The magnetically active core 22 of the rotor 2 is here also preferably configured substantially in ring shape or cylinder shape and extends substantially over the total axial height of the rotor 2.

Unlike the first embodiment, in the second embodiment, position sensors 5 are provided both in the region of the lower stator part 32 and in the region of the upper stator part 31 so that tilts of the rotor 3 with respect to the radial plane can be detected.

It is in particular preferred in the second embodiment that each of the coils of the lower stator part 32 and each of the coils of the upper stator part 31 can be controlled separately so that the rotor 3 can be actively magnetically regulated with respect to tilts toward the radial plane (two degrees of freedom). It is understood that the two stator parts 31, 32 can also have more than three coils and poles, in particular also four, five or six coils and upper poles 310 and lower poles 320.

It is understood that more than two impellers 21, 25 can also be provided on the rotor.

Figure 26:
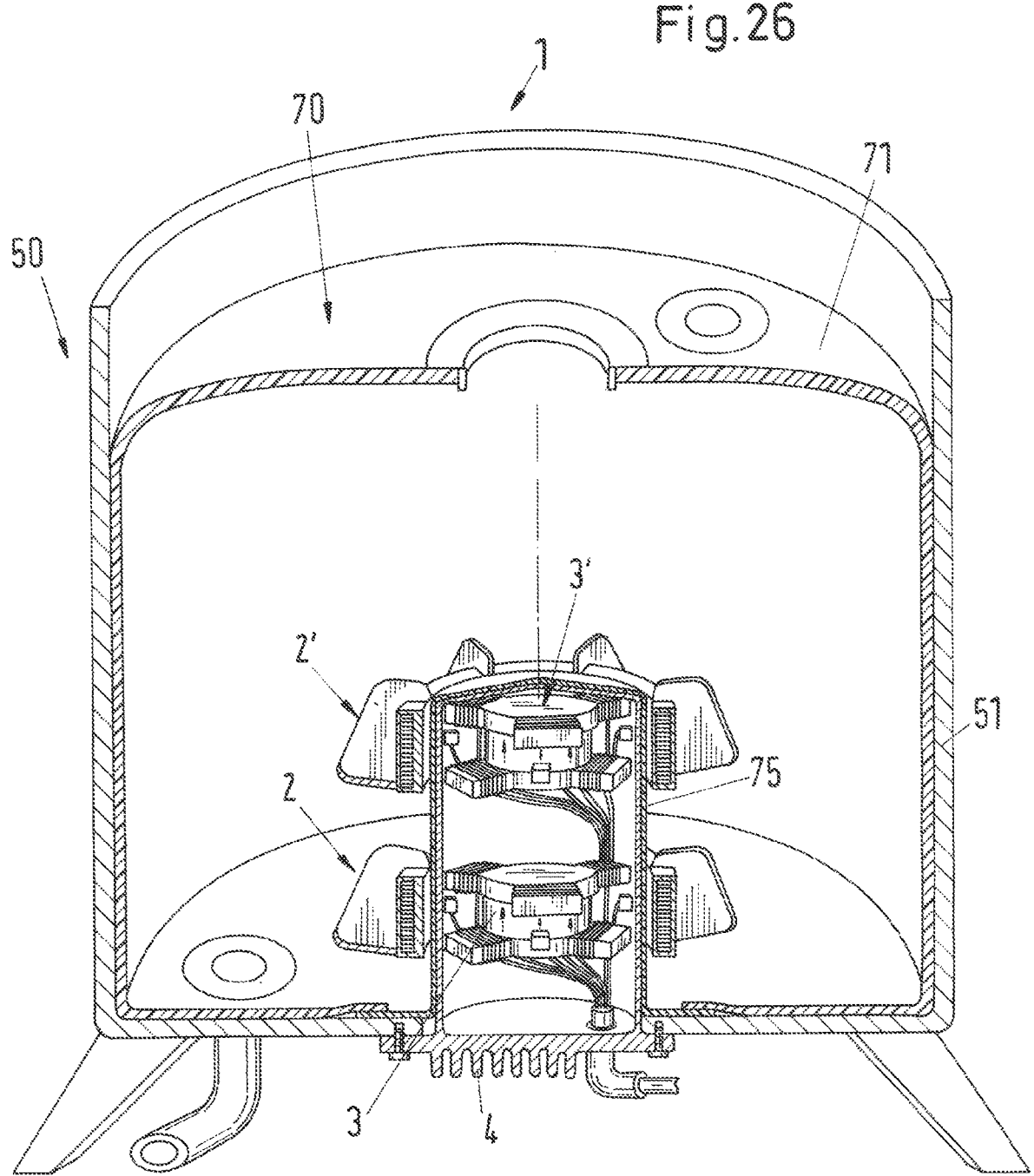
FIG. 26 is a perspective sectional representation of a third embodiment of a mixing apparatus in accordance with the invention in an analog representation to FIG. 1.

FIG. 26 shows in a representation analog to FIG. 1 a perspective sectional representation of a third embodiment of a mixing apparatus 1 in accordance with the invention. In the following, only the differences from the above-described first and second embodiments will be looked at. The reference numerals in particular have the same meaning as has already been explained in connection with the first and second embodiments. It is understood that all the above-described variants, embodiments and measures can also be realized in the same manner or in analogously the same manner in the third embodiment.

The third embodiment is characterized in that two rotors 2, 2' are provided in the mixing tank of which each comprises a respective one impeller 21, 21' for mixing the substances. Each rotor 2, 2' can here also respectively be magnetically contactlessly driven and is configured free of coils in each case. In the operating state, the two rotors 2, 2' are arranged spaced apart with respect to the axial direction and coaxially, i.e. they have the same desired axis of rotation A.

Two stators 3, 3' are furthermore provided of which each is configured in accordance with one of the above-described embodiments. Both stators 3, 3' are arranged in the separating can 4 and are spaced apart from one another axially. The lower stator 3 in accordance with the illustration is associated with the lower rotor 2 in accordance with the illustration and forms with it an electromagnetic rotary drive which is configured according to the principle of the bearingless motor. The upper stator 3' in accordance with the illustration is associated with the lower rotor 2' in accordance with the illustration and forms with it an electromagnetic rotary drive which is configured according to the principle of the bearingless motor.

The two rotors 2, 2' are likewise configured in accordance with one of the above-described embodiments. The two rotors 2, 2' can be configured as substantially the same or also differently.

The same applies to the two stators 3, 3'. They can also be configured substantially the same or also differently, for example with a different number of lower or upper poles 320, 310.

The special advantage of the third embodiment lies in the fact that considerably more mixing procedures can hereby be realized; it is thus possible, for example, that the two rotors 2, 2' rotate in different directions and/or at different speeds of rotation.

In the above-described embodiments, variants and measures, reference is made to such cases in which the lower stator part 32 has the same number of lower poles 320 as the upper stator part 31 has upper poles 310. This is naturally by no means necessarily so. Embodiments are by all means also possible in which the number of upper poles 310 is different than the number of lower poles 320.

Figure 27:
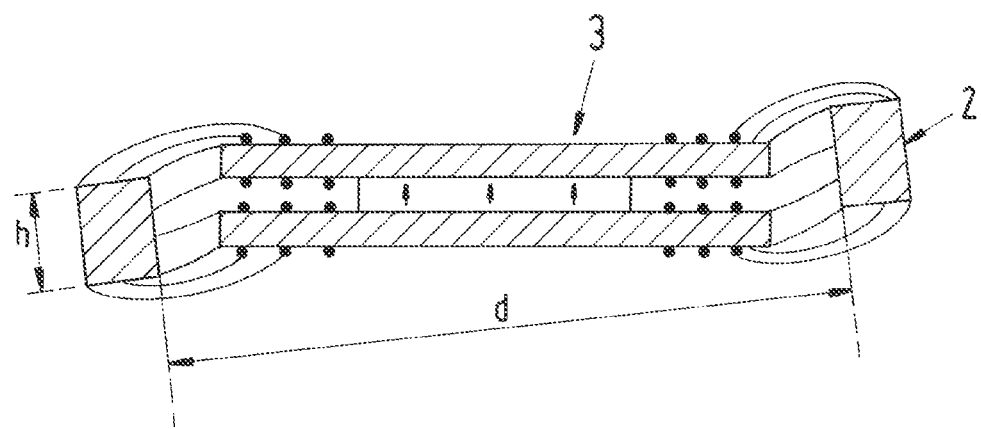
FIG. 27 is a schematic representation for illustrating the passive magnetic stabilization of the rotor against tilts.
Figure 28:
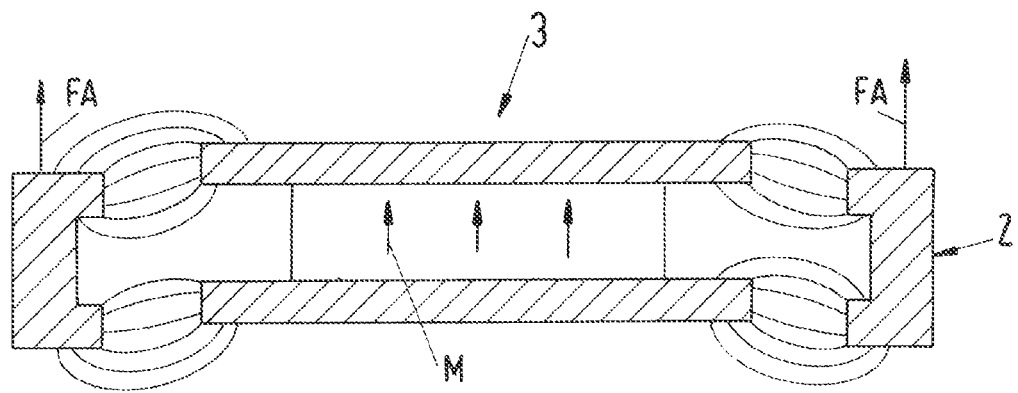
FIG. 28 is a schematic representation for illustrating the passive magnetic stabilization of the axial position of the rotor.

The stator 3 and the rotor 2 together form an electromagnetic rotary drive which, as already explained, preferably works according to the principle of the bearingless motor. In a bearingless motor, at least three degrees of freedom of the rotor, namely its rotation about the desired axis of rotation A and its position in the radial plane, can always be actively magnetically regulated. The degree of freedom of the axial position of the rotor 3 is passively magnetically stabilized in the bearingless motor of the mixing apparatus in accordance with the invention, that is no separate axial magnetic bearing or mechanical axial bearing is required. On the one hand, the rotor 2, which is part of the single-use apparatus 70 of the mixing apparatus 1 thereby becomes particularly simple and inexpensive and, on the other hand, the rotor 2 together with the remaining components of the single-use apparatus 70 can be simply separated from the reusable apparatus 50, in particular from the stator 3 and from the separating can 4. Due to the lack of axial bearing components, the rotor 2, which is restricted in its degree of movement with respect to the axial direction at most only via the holding elements 752, 753 connected to the bucket 75, can namely be drawn together with the bucket 75 simply axially from the separating can 4 which contains the stator 3. The magnetically active core 22 of the rotor 2 is in this respect drawn back as by magnetic spring forces on deflection in the axial direction by the magnetic fields emanating from the stator. This is illustrated in the very schematic representation in FIG. 28. If the rotor 3 is moved out of the desired position, that is out of the radial plane, with respect to its axial position (downwardly in accordance with the illustration in FIG. 28), this effects passively magnetically axial restoring forces, represented by the arrows FA in the axial direction, which move the rotor 2 after the disappearance of the other external forces back into its desired position with respect to the axial direction. In this respect, the forces FA first increase with the deflection, reach a maximum at a specific deflection which depends on the geometry of the magnetically active core 22 of the rotor 2, on the geometry of the upper stator part 31 and of the lower stator part 32, on the spacing between the upper stator part 31 and the lower stator part 32, on the geometry and the magnetic properties of the permanent magnet 33 and on the air gap (the spacing between the stator parts 31 and 32, on the one hand, and the magnetically active core 22 of the rotor 2, on the other hand) and then decrease again. In the bearingless motor for the mixing apparatus 1 in accordance with the invention, the characteristic of the inherent axial passive magnet bearing is selected such that the axial forces which act on the rotor 2 lie beneath the maximum force of the axial passive magnet bearing in the total operating range and such that the maximum force of the axial passive magnet bearing remains small enough for the rotor 2 with the single-use apparatus 70 to be able to be separated easily and without tools from the separating can 4 and the stator 3. In this respect, a maximum force of the axial passive magnet bearing of a maximum of 200 Newtons has been found to be still manageable without tools or an auxiliary apparatus. With smaller mixing apparatus, a considerably smaller maximum force of the axial passive magnet bearing is selected to design the insertion and removal of the single-use apparatus 70 from the reusable apparatus 50 as simply as possible. Values between 10 Newtons and 80 Newtons are typical for mixing apparatus for 50 liters to 1000 liters and for low-viscosity liquids. With large mixing apparatus for volumes of more than 1000 liters or also with mixing apparatus for high-viscosity liquids and/or with mixing apparatus which work at high revolution speeds, the impeller 21, 52 additionally has to be designed such that only restricted hydrodynamic axial forces occur. This can be achieved in that the axial blade incline (angle of a blade of the impeller 21, 51 with respect to the axial direction) is kept small, as is shown, for example, in the blades 211 in FIG. 2. With arrangements of two or more impellers 21, 25 on the rotor 2, as shown for example in FIG. 25, the blade inclination can also take place in opposite directions, for example in the lower impeller of the rotor 2 in accordance with the illustration in the direction of rotation and in the upper impeller of the rotor 2' in accordance with the illustration opposite to the direction of rotation so that the hydrodynamic axial forces cancel one another out in full or in part. Since the hydrodynamic axial forces which act on the rotor 2 depend greatly on the revolution speed and on the viscosity, in addition to the maximum force the stiffness of the axial passive magnet bearing is also of importance for the optimum function of the mixing apparatus in accordance with the invention. In this respect, the stiffness of the axial passive magnet bearing should be selected such that operating states are avoided in which the rotor 2 touches the holding elements 752, 753 or other parts of the mixing apparatus. It should in addition be ensured that the position sensors 5 can determine the radial position and at best also the angular position of the rotor 2 in every operating state. For example, care should be taken in the embodiment shown in FIG. 8 that, in every operating state, the axial deflection of the rotor 2 is restricted so much that a sufficient axial overlap is still ensured between the peripheral ring 222 and the position sensors 5. A passively magnetic stabilization can likewise be realized for the two remaining degrees of freedom, namely the tilts of the rotor 2 relative to the radial plane, in all embodiments with the exception of those in accordance with FIG. 25. As already previously described, in such embodiments, the regulation of the bearingless motor becomes particularly simple and the number of power amplifier channels can also be reduced. How this can be realized in the bearingless motor of the mixing apparatus in accordance with the invention is illustrated in FIG. 27. On the tilting of the rotor 2 shown there, passively magnetic restoring forces arise which effect a torque due to their different directions at the left and right sides of the rotor 2 in accordance with the illustration, said torque counteracting the tilt so that the rotor 2 is also passively magnetically stabilized with respect to these two degrees of freedom. This passive stabilization, however, only works when specific geometric conditions are satisfied. If the inner diameter of the rotor 2 is marked by d and the height of the magnetically active core 22 of the rotor by h, the inner diameter must be at least 2.6 times as large as the height h. The condition $d>2.5*h$ should then be satisfied, that is the inner diameter d should be larger than 2.6 times the height h.

For this reason, it is also preferred for the mixing apparatus 1 in accordance with the invention if the rotor 2 to be stabilized purely passively magnetically with respect to tilts toward the radial plane (two degrees of freedom), if the inner diameter of the rotor 2 is at least 2.6 times as large as the height h of the magnetically active core 22 in the axial direction.

In embodiments of the invention in which this geometrical condition is no longer satisfied, the rotor 2 is actively magnetically regulated with respect to these tilts.

In the above-described embodiments, variants and measures, reference is made to such cases in which the electromagnetic rotary drive formed from the stator 3 and the rotor 2 is configured as an external rotor, that is with an inwardly disposed stator 3 and a rotor 2 arranged around it. It is understood that the invention is not restricted to such cases, but that, the mixing apparatus 1 in accordance with the invention, the rotor 2 and the stator 3 can also form an electromagnetic rotary drive which is configured as an internal rotor 2, that is with an inwardly disposed rotor 2 and a stator 3 arranged around it.

With reference to FIG. 1 or FIG. 2, such a configuration as an internal rotor can be realized, for example, such that the bucket 75 is not aligned into the mixing tank 71, but rather out of the mixing tanks 1, that is downwardly in accordance with the illustration in FIG. 1 or FIG. 2. The rotor 2 is then placed into the inner space of the bucket 75 and the stator 3 is arranged around the bucket 75.

In accordance with the invention, a single-use apparatus 70 is furthermore proposed for a mixing apparatus 1 for mixing at least two substances, wherein the mixing apparatus 1 comprises a reusable apparatus 50 which is designed for multiple use. The single-use apparatus 70 is designed for single use and comprises a flexible mixing tank 71, which is manufactured from a plastic, for receiving the substances to be mixed and a rotor 2 which is arranged in the mixing tank 71, which comprises an impeller 21 for mixing the substances and which is designed for a contactless magnetic drive, wherein the single-use apparatus 70 is designed for cooperation with the reusable apparatus 50 and can be placed into a support tank 51 of the reusable device 50, wherein the rotor 2 can be contactlessly driven by a stator 3 of the reusable device 50 about a desired axis of rotation A by a rotating magnetic field. In accordance with the invention, the rotor 2 is designed free of coils and free of permanent magnets.

The single-use apparatus 70 in accordance with the invention is in particular suitable for the mixing apparatus 1 in accordance with the invention which is described above. The single-use apparatus in accordance with the invention is, however, not restricted to the specifically described mixing apparatus 1 or to the specifically described embodiment of the reusable apparatus 50 of the mixing apparatus 1.

The single-use apparatus is also suitable for cooperation with differently designed mixing apparatus, for example for those in which the reusable part of the mixing apparatus comprises a stator which is designed without permanent magnets, in which therefore the drive of the rotor 2 takes place electromagnetically or in which the generation of the drive flux is only based on electromagnetically generated rotational fields.

What is important is only that the reusable apparatus of the mixing apparatus comprises a stator which is suitable to drive the rotor of the single-use apparatus magnetically contactlessly and that the single-use apparatus in accordance with the invention can cooperate with the reusable apparatus such that the flexible mixing tank of the single-use apparatus can be received by a support tank of the reusable apparatus such that the rotor of the single-use apparatus can be driven magnetically contactlessly by the stator of the reusable apparatus.

The rotor 2 of the single-use apparatus in accordance with the invention is preferably designed such that it can be driven magnetically contactlessly about the desired axis of rotation A in the operating state and can be magnetically contactlessly supported with respect to the stator 3.

It is further preferred if the single-use apparatus comprises a bucket 75 of plastic which at least radially surrounds the stator in the inserted state of the single-use apparatus 70 and which is arranged radially within the rotor 2.

It is furthermore advantageous if the rotor 2 is designed such that it can be magnetically passively supported in the stator 3 in the axial direction.

The rotor 2 is preferably designed such that it can be magnetically passively stored or stabilized with respect to tilts in the stator.

It is a further advantageous measure that the rotor 2 comprises a magnetically effective core 22 and the inner diameter of the magnetic core of the rotor 2 is at least 2.6 times as large as the height h of the magnetically effective core 22 of the rotor 2.

In accordance with a possible embodiment, the rotor 2 comprises at least two impellers 21, 25 for mixing the substances, wherein the two impellers 21, 25 are arranged spaced apart from one another with respect to the axial direction fixed by the desired axis of rotation A of the intended use.

In accordance with an embodiment of the single-use apparatus 70 in accordance with the invention, at least two rotors 2, 2' arranged in the mixing tank 71 are provided of which each comprises a respective impeller 21 for mixing the substances, wherein each rotor 2, 2' is designed for the contactless magnetic drive and is respectively designed as free of coils. In this respect, the rotors 2, 2' are arranged spaced apart from one another and coaxially with respect to the axial direction.

It is a possibility of the design that the magnetically effective core of the rotor 2 has a plurality of pronounced rotor poles 221 which face poles 310, 320 of the stator 3, 3' in the operating state.

It is a further advantageous measure that the rotor poles 221 are designed as asymmetrical or are arranged such that positions of engagement with respect to the stator 3 are avoided in the operating state.

The invention claimed is:

1. A mixing apparatus for mixing at least two substances, comprising:
    a single-use apparatus configured for single use; and
    a reusable apparatus configured for multiple use,
    the single-use apparatus comprising a flexible mixing tank configured to receive the at least two substances to be mixed, being plastic, and having a rotor arranged in the mixing tank, the rotor comprising an impeller configured to mix the at least two substances, the impeller being magnetically contactlessly drivable and free of coils and permanent magnets, and
    the reusable apparatus comprising a support tank configured to receive the mixing tank and a stator configured to magnetically contactlessly drive the rotor about an axis of rotation in an operating state, the stator comprising at least one permanent magnet configured to generate a permanent magnet flux and at least one winding configured to generate an electromagnetic flux, the permanent magnet flux and the electromagnetic flux both together forming a resultant force contributing to a torque that is capable of driving the rotor.

2. A mixing apparatus in accordance with claim 1, wherein the at least one winding is configured to generate the electromagnetic flux so as to not conduct the electromagnetic flux through the permanent magnet.

3. A mixing apparatus in accordance with claim 1, wherein the stator is a bearing and drive stator configured to magnetically contactlessly drive the rotor about the axis of rotation in the operating state, and the rotor being configured to be magnetically contactlessly supported with respect to the stator.

4. A mixing apparatus in accordance with claim 1, wherein the reusable apparatus has a separating can configured to receive the stator, and which is fixable with respect to the support tank.

5. A mixing apparatus in accordance with claim 4, wherein the stator is surrounded at least radially by the separating can and the rotor is arranged outside the separating can with respect to a radial direction.

6. A mixing apparatus in accordance with claim 5, wherein the single-use apparatus comprises a bucket including plastic, the bucket at least radially surrounding the separating can in an inserted state of the single-use apparatus and being arranged radially within the rotor.

7. A mixing apparatus in accordance with claim 1, wherein the stator comprises pronounced poles.

8. A mixing apparatus in accordance with claim 1, wherein the stator comprises an upper stator part having a plurality of pronounced upper poles configured to carry upper windings and a lower stator part having a plurality of pronounced lower poles configured to carry lower windings, the upper stator part and the lower stator part being arranged spaced apart from one another with respect to an axial direction, and the permanent magnet is disposed between the upper stator part and the lower stator part.

9. A mixing apparatus in accordance with claim 1, wherein the rotor is passively magnetically supported in an axial direction.

10. A mixing apparatus in accordance with claim 1, wherein the rotor is passively magnetically supported against tilting.

11. A mixing apparatus in accordance with claim 10, wherein the rotor comprises a magnetically active core and an inner diameter of the rotor is at least 2.6 times as large as a height of the magnetically active core of the rotor.

12. A mixing apparatus in accordance with claim 1, wherein the impeller is a first impeller and the rotor comprises a second impeller configured to mix the at least two substances, the first and second impellers being arranged spaced apart from one another with respect to an axial direction.

13. A mixing apparatus in accordance with claim 1, wherein the rotor is a first rotor of at least two rotors arranged in the mixing tank, and each of the at least two rotors comprises an impeller configured to mix the at least two substances, being magnetically contactlessly drivable and being free of coils, the at least rotors being arranged spaced apart from one another and coaxially with respect to an axial direction in the operating state, and the reusable apparatus has first and second stators, each of the first and second stators being a bearing and drive stator, and each of the first and second stators comprising an upper stator part having a plurality of pronounced upper poles configured to carry upper windings and a lower stator part having a plurality of pronounced lower poles configured to carry lower windings, the upper stator part and the lower stator part of each of the first and second stators being arranged spaced apart from one another with respect to the axial direction, the permanent magnet is a first permanent magnet, the first permanent magnet and a second permanent is disposed are respectively disposed between the upper stator part and the lower stator part of the first and second stators, and the first and second stators are arranged spaced apart from one another with respect to the axial direction in the operating state.

14. A mixing apparatus in accordance with claim 7, wherein the rotor includes a magnetically active core having a plurality of pronounced rotor poles which face the poles of the stator in the operating state.

15. An apparatus for a mixing apparatus for mixing at least two substances, comprising:
 a reusable apparatus configured for multiple use; and
 a single-use apparatus configured for a single use and comprising a flexible plastic mixing tank configured to receive the at least two substances to be mixed and a rotor arranged in the mixing tank, the rotor comprising an impeller configured to mix the at least two substances and a magnetically effective core having an inner diameter at least 2.6 times as large as a height of the magnetically effective core, and the rotor being configured to operate with a contactless magnetic drive, the single-use apparatus being configured to cooperate with the reusable apparatus and placed into a support tank of the reusable device, and the rotor being configured to be contactlessly driven by a stator of the reusable device about an axis of rotation by a rotating magnetic field, the rotor being free of coils and permanent magnets, the stator configured to magnetically contactlessly drive the rotor about an axis of rotation in an operating state, the stator comprising at least one permanent magnet configured to generate a permanent magnet flux and at least one winding configured to generate an electromagnetic flux, the permanent magnet flux and the electromagnetic flux both together forming a resultant force contributing to a torque that is capable of driving the rotor.

\* \* \* \* \*